(12) United States Patent
Terahara et al.

(10) Patent No.: US 8,717,691 B2
(45) Date of Patent: May 6, 2014

(54) LENS BARREL

(75) Inventors: Daisuke Terahara, Yokohama (JP);
Takehide Ohno, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 13/230,013

(22) Filed: Sep. 12, 2011

(65) Prior Publication Data

US 2012/0063014 A1   Mar. 15, 2012

(30) Foreign Application Priority Data

Sep. 13, 2010 (JP) ................. 2010-203937

(51) Int. Cl.
| | |
|---|---|
| G02B 7/02 | (2006.01) |
| G11B 7/09 | (2006.01) |
| G02B 25/00 | (2006.01) |
| H04N 5/232 | (2006.01) |
| G02B 7/10 | (2006.01) |
| G03B 19/07 | (2006.01) |
| H04N 5/262 | (2006.01) |
| G02B 15/14 | (2006.01) |
| G03B 17/00 | (2006.01) |

(52) U.S. Cl.
CPC ............ *G11B 7/0932* (2013.01); *G02B 25/002* (2013.01); *G02B 7/021* (2013.01); *H04N 5/23296* (2013.01); *G02B 7/102* (2013.01); *G02B 7/10* (2013.01); *G03B 19/07* (2013.01)
USPC ........... 359/813; 359/811; 359/812; 359/699; 359/700; 359/701; 348/240.3; 348/240.99; 396/72; 396/77; 396/82

(58) Field of Classification Search
CPC .......... G02B 7/021; G02B 7/102; G02B 7/10; G02B 25/002; G11B 7/0932; H04N 5/23296; G03B 19/07
USPC .............. 359/813, 694–706, 824; 396/72–88; 348/240.3
See application file for complete search history.

(56) References Cited

U.S. PATENT DOCUMENTS

| | | | |
|---|---|---|---|
| 7,643,750 B2 | 1/2010 | Irisawa et al. | |
| 7,864,446 B2 | 1/2011 | Terahara | |
| 7,885,523 B2 | 2/2011 | Ohno et al. | |
| 7,929,849 B2 | 4/2011 | Ohno | |
| 2009/0073581 A1* | 3/2009 | Nuno | 359/813 |
| 2009/0086040 A1 | 4/2009 | Ohno | |
| 2009/0168208 A1 | 7/2009 | Katsumata et al. | |
| 2011/0001872 A1* | 1/2011 | Honsho et al. | 348/362 |
| 2011/0194194 A1 | 8/2011 | Terahara | |

FOREIGN PATENT DOCUMENTS

| | | |
|---|---|---|
| JP | 11-271587 | 10/1999 |
| JP | 2006-72059 | 3/2006 |
| JP | 2008-111932 | 5/2008 |

(Continued)

*Primary Examiner* — Ricky Mack
*Assistant Examiner* — Daniele Manikeu
(74) *Attorney, Agent, or Firm* — Oblon, Spivak, McClelland, Maier & Neustadt, L.L.P.

(57) ABSTRACT

A lens barrel includes a lens group including a fixed lens including one or more lenses and an adjustment lens including one or more lenses, and a lens frame to hold the lens group, including an adjustment lens frame to hold the adjustment lens and an aligning mechanism to hold the adjustment lens frame movably in a direction orthogonal to an optical axis of the lens group relative to the lens frame.

13 Claims, 25 Drawing Sheets

(56) References Cited

FOREIGN PATENT DOCUMENTS

| | | |
|---|---|---|
| JP | 2008-158260 | 7/2008 |
| JP | 2008-170889 | 7/2008 |
| JP | 2008-176013 | 7/2008 |
| JP | 2008-233575 | 10/2008 |
| JP | 2008-249883 | 10/2008 |

* cited by examiner

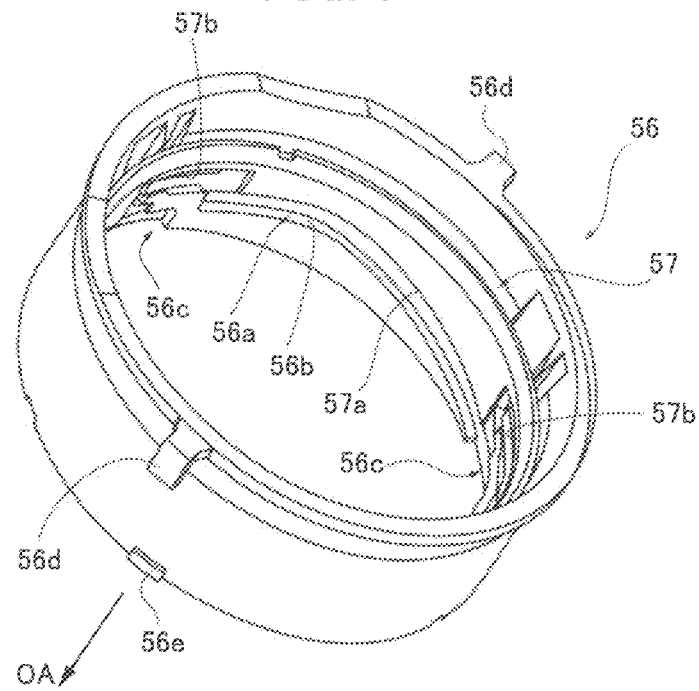
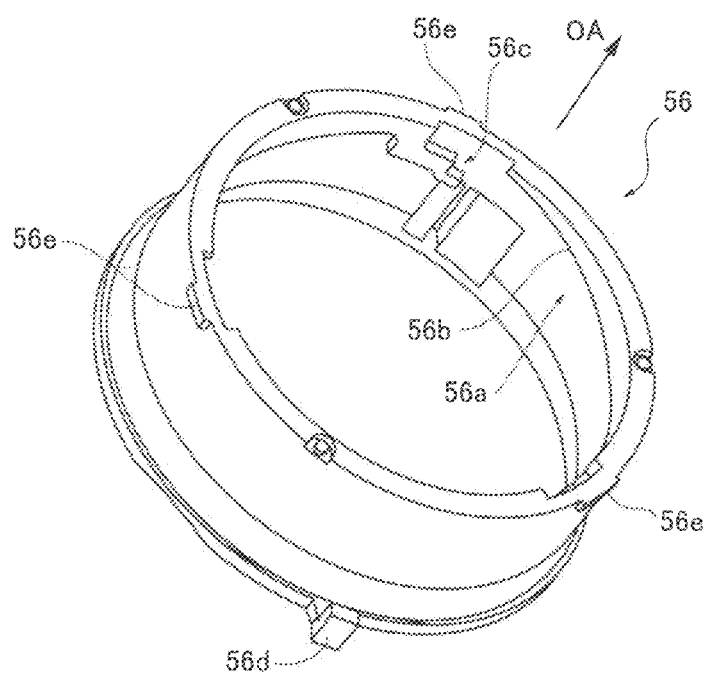

LENS BARREL

CROSS REFERENCE TO RELATED APPLICATION

The present application is based on and claims priority from Japanese Patent Application No. 2010-203937, filed on Sep. 13, 2010, the disclosure of which is hereby incorporated by reference in its entirety.

BACKGROUND OF THE INVENTION

1. Field of the Invention

The present invention relates to a lens barrel to hold a plurality of lenses, in particular to one to facilitate the axis alignment of lenses.

2. Description of the Prior Art

In recent years there has been a continuous demanding for an imaging device such as a camera to downsize and improve image quality. To improve image quality, the number of lenses has been increased and to downsize the imaging device, a lens barrel configured to collapse the lenses into a camera housing at non-photographing and protrude them at photographing has been developed. It is necessary to precisely align the optical axes of lenses at a predetermined position in accordance with the setting of an optical system in a direction orthogonal to the optical axis of the optical system. Japanese Patent Application Publication No. 2008-111932 discloses a lens barrel in which the optical axes of lenses are precisely aligned in a direction orthogonal to the optical axis of the lenses for the purpose of align the optical axes of whole or part of the optical system, for example.

This lens barrel is configured that a first cylindrical lens frame holding a first lens includes a concave portion and a second cylindrical lens frame holding second and third lenses is fitted into the concave portion. The concave portion is formed around the first lens frame to fit into the second lens frame with a predetermined gap. In this lens barrel the optical axis of the second lens can be aligned with that of the first lens by fitting the second lens frame holding the second lens into the concave portion of the first lens frame holding the first lens, two-dimensionally adjusting it in a minute amount in a direction orthogonal to the optical axis with a certain aligning device and filling the gap with an adhesive at the adjusted position to fix the second lens frame. Thus, axis alignment can be easily done by a simple process of aligning one lens with the other.

However, the conventional lens barrel as above requires the use of an axis aligning device of a precise, complex structure to precisely align the axes of lenses to fix them at the aligned position with an adhesive. Because of this, in reality it is extremely difficult to properly maintain the aligned positions for fixation and align the optical axes of the lenses with precision.

SUMMARY OF THE INVENTION

An object of the invention is to provide a lens barrel with a simple structure in which lens axis alignment can be precisely, simply done.

A lens barrel includes a lens group having a fixed lens including one or more lenses and an adjustment lens including one or more lenses, and a lens frame to hold the lens group, including an adjustment lens frame to hold the adjustment lens and an aligning mechanism to hold the adjustment lens frame movably in a direction orthogonal to an optical axis of the lens group relative to the lens frame.

BRIEF DESCRIPTION OF THE DRAWINGS

Features, embodiments, and advantages of the present invention will become apparent from the following detailed description with reference to the accompanying drawings:

FIG. 9 is a perspective view of the cylinder of the second rotary cam cylinder 57 fit into the first rotary cam cylinder 56;

FIG. 10 is a perspective view of the first rotary cam cylinder 56;

FIG. 11A is a perspective view of the second rotary cam cylinder 57 seen from the subject while

DETAILED DESCRIPTION OF THE PREFERRED EMBODIMENT

Hereinafter, embodiments of a lens barrel according to the present invention will be described in detail with reference to the accompanying drawings.

First Embodiment

The structure of a lens barrel 10 according to a first embodiment is schematically described with reference to FIGS. 1 to 21 by way of example.

Figure 1:
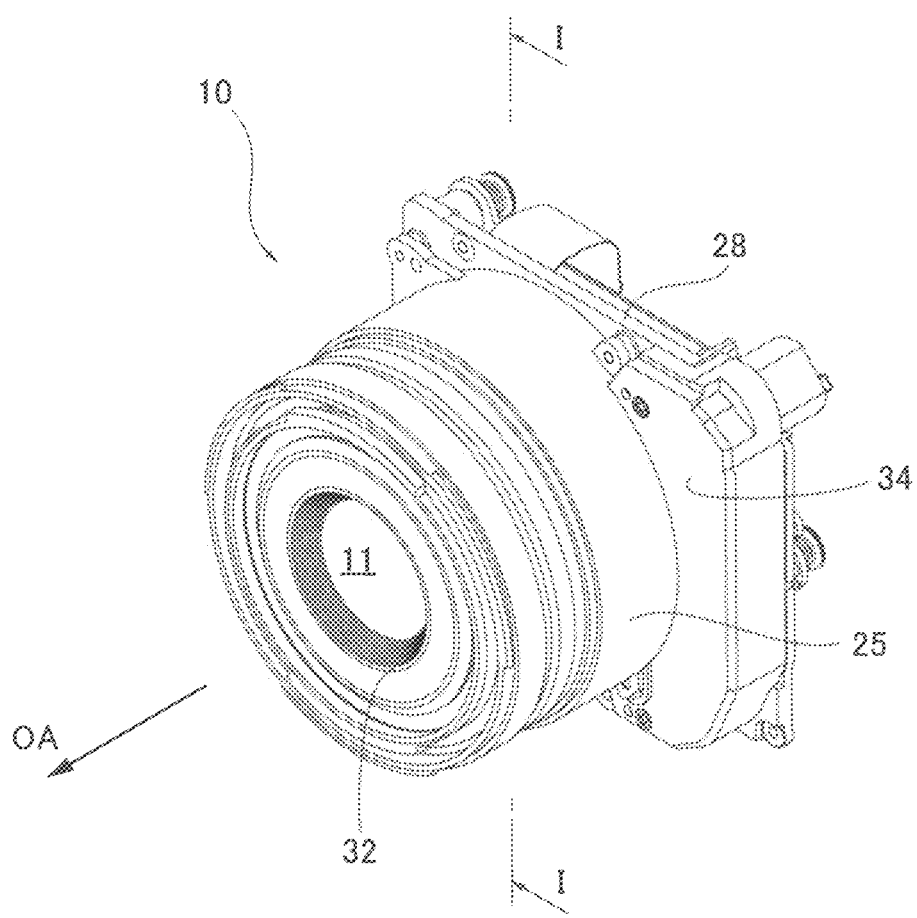
FIG. 1 is a perspective view of a lens barrel according to one embodiment of the present invention seen from a subject side.
Figure 2A:
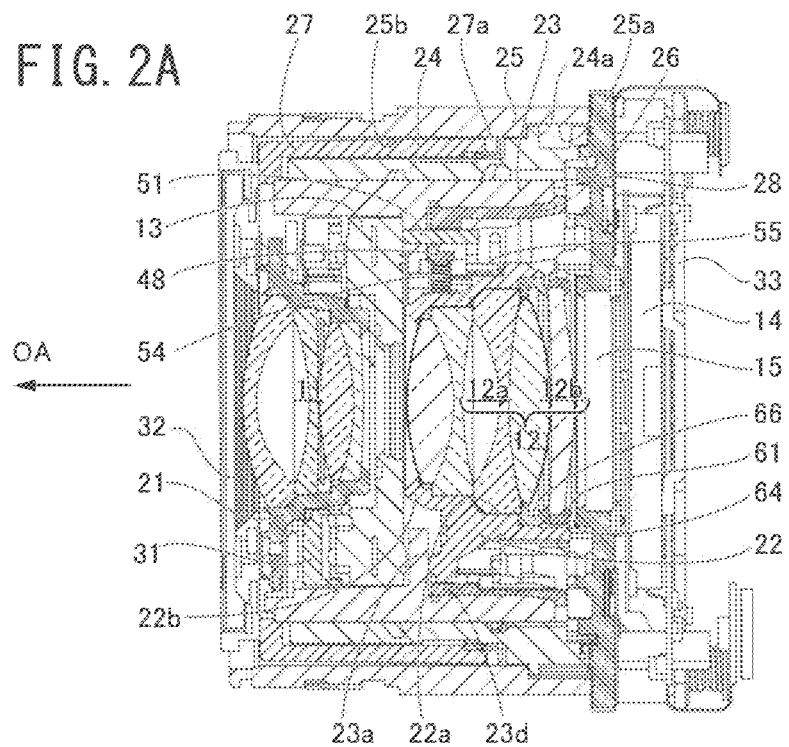
FIG. 2A is a cross section view of the lens barrel along I to I line in FIG. 1 in a contained state and FIG. 2B is the same in a shooting state.
Figure 2B:
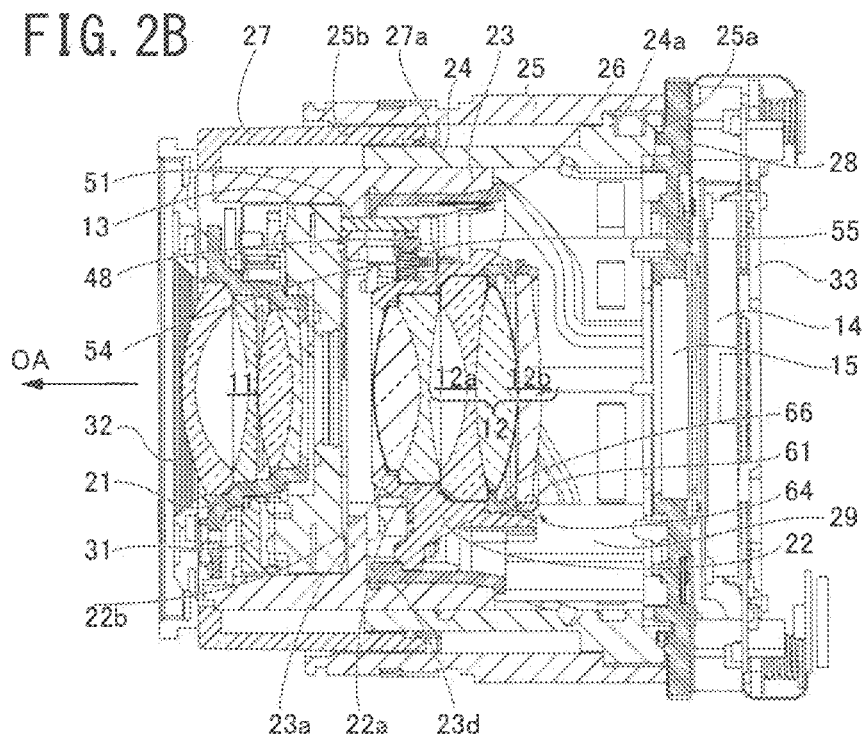

FIGS. 2A, 2B show an optical unit which includes the lens barrel 10, a first lens group 11, a second lens group 12, a shutter and diaphragm unit 13, a solid-state image sensor 14, a cover glass 15, a first lens frame 21, a second lens frame 22, a moving cylinder 23, a rotary cylinder 24, a fixed cylinder 25, a rotary cam unit 26, a connection frame 27, a base 28, liners 29, a blade spring 30 (FIG. 3), a spring bearing 31, a stepped frame 32, a circuit board 33, a driver 34 (FIG. 1), and an aligning mechanism 64.

In the optical unit the first lens group 11 and the second lens group 12 are arranged in order from a subject side and the shutter and diaphragm unit 13 is inserted between the two lens groups. The solid-state image sensor 14 including a CCD and the cover glass 15 for the light-receiving face of the sensor are arranged on an image plane side of the second lens group 12. The solid-state image sensor 14 is mounted on the circuit board 33 and the cover glass 15 is provided on the base 28. The circuit board 33 is fixed on the base 28 and constitutes an electric circuit on which not-shown electric parts are mounted.

The first lens group 11 comprises one or more lenses and is fixedly held in the moving cylinder 23 via the first lens frame 21 integrally holding the first lens group 11 and the connection frame 27.

The second lens group 12 comprises a fixed lens 12a including one or more lenses held in the second lens frame 22, and an adjustment lens 12b including one or more lenses. In the present embodiment the fixed lens 12a is made up of four lenses and disposed on the subject side or first lens group 11 side of the second lens group 12. The adjustment lens 12b is held in a later-described adjustment lens frame 61 which is held in the second lens frame 22 via the aligning mechanism 64 and adjustable in position relative to the second lens frame 22 or fixed lens 12a. The aligning mechanism 64 will be described later in detail. In the present embodiment the adjustment lens 12b is formed of a single lens with two aspherical faces and disposed on the image plane (solid-state image sensor 14) side of the second lens group 12. The second lens group 12 in the second lens frame 22 is held in the moving cylinder 23 via the rotary cam unit 26.

The shutter and diaphragm unit 13 is fixed in the moving cylinder 23. The first and second lens groups 11, 12 constitute an optical system as a focal length variable zoom lens or fixed focal length lens. The electric circuit including the solid-state image sensor 14 is placed at an imaging position of the optical system. Herein, the optical axial line of the optical system or the symmetric rotary axis of the first and second lens groups 11, 12 is defined to be the optical axis OA of the optical system or the lens barrel 10.

The fixed cylinder 25 is fixed on the base 28 in FIG. 1 and includes a guide groove 25a and a straight groove 25b in an inner circumference. The guide groove 25a is of a ring shape provided along a plane orthogonal to the optical axis OA and the straight groove 25b is provided in the optical axis direction. The rotary cylinder 24 is fitted into the inner circumference of the fixed cylinder 25.

The rotary cylinder 24 includes a key portion 24a on an outer circumference. The key portion 24a is protruded from a bottom end along a plane orthogonal to the optical axis OA in a radiation direction (hereinafter, radial direction) from the rotation center, to engage with the guide groove 25a of the fixed cylinder 25. Thus, the rotary cylinder 24 and the fixed cylinder 25 can be relatively rotated around the optical axis OA while prevented from relatively moving in the optical axis direction (optical path). The rotary cylinder 24 is rotatable around the optical axis OA while it is in a fixed position in the optical axis direction relative to the base 28. The rotary cylinder 24 is rotated relative to the fixed cylinder 25 by receiving a force from a driver 34 (FIG. 1) provided on the circuit board 33 or the fixed cylinder 25.

Figure 3:
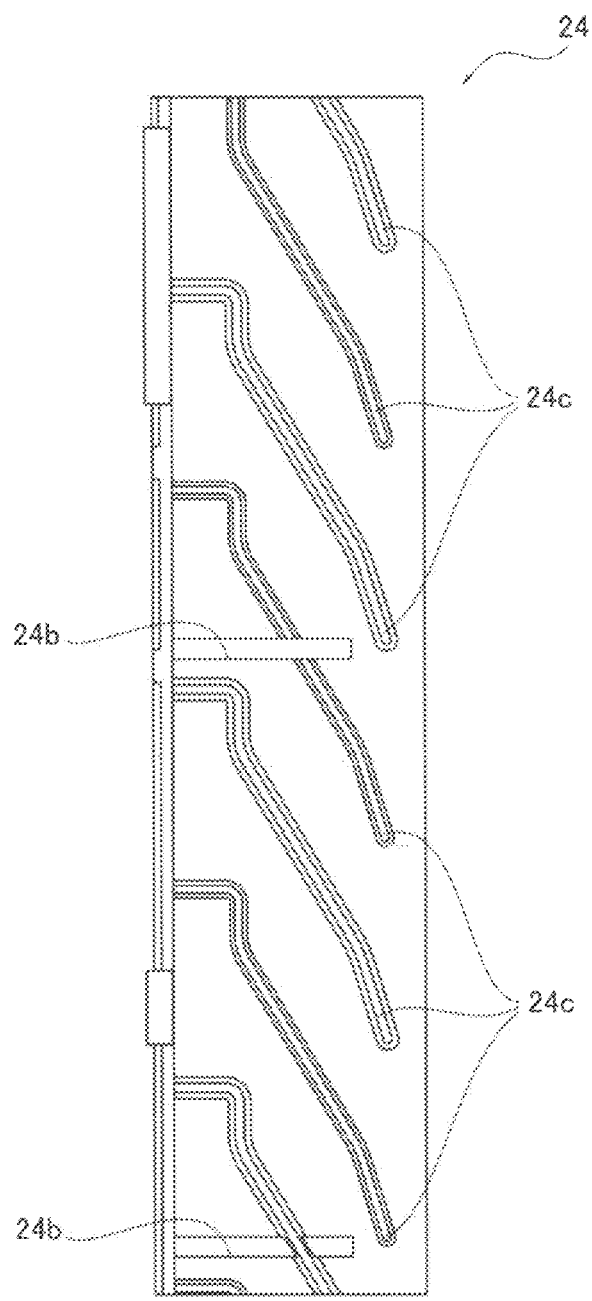
FIG. 3 is an exploded view of a cam groove formed in a rotary cylinder 24.

As shown in FIG. 3, the rotary cylinder 24 includes on the inner circumference the straight grooves 24b in the axial direction to engage with a later-described first key protrusion 56d of the rotary cam unit 26 (FIG. 8) and cam grooves 24c. The rotary cam unit 26 is rotatable relative to the fixed cylinder 25 or base 28 along with the rotation of the fixed cylinder 25 or base 28.

The bottom end of the connection frame 27 is inserted between the rotary cylinder 24 and the fixed cylinder 25 in FIGS. 2A, 2B. The connection frame 27 is configured to abut with a protrusion 27a at near the bottom end. The protrusion 27a is engaged with the straight groove 25b of the fixed cylinder 25, which allows the connection frame 27 to move straight relative to the fixed cylinder 25 in the optical axis direction and at the same time prevents it from rotating around the optical axis OA. The top end (subject side) of the connection frame 27 is connected with the first lens frame 21 and fixed to the end of the moving cylinder 23. The moving cylinder 23 is fitted into the inner circumference of the rotary cylinder 24.

Figure 7:
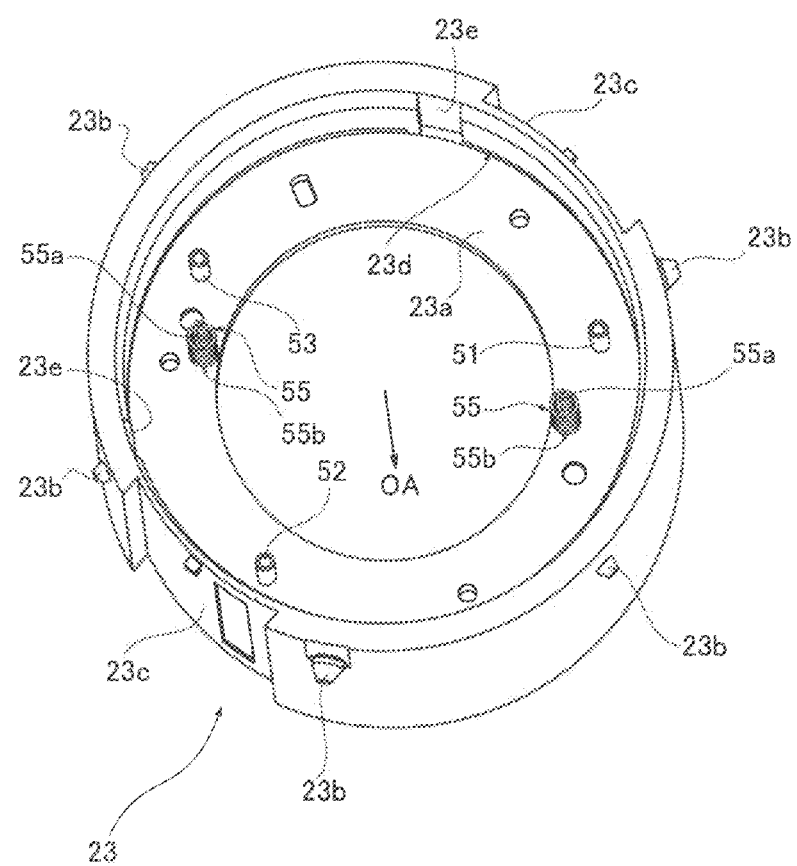
FIG. 7 is a perspective view of the moving cylinder 23 seen from the image plane.

The moving cylinder 23 includes a flange 23a with a smaller inner diameter at an axial middle position as shown in FIG. 7 and else. The first lens frame 21 holding the first lens group 11 and the shutter and diaphragm unit 13 are contained in a front space (a subject side) of the flange 23a and the second lens frame 22 holding the second lens group 12 and the rotary cam unit 26 are contained in a back space (an image plane side) of the flange 23a, as later described in detail.

Figure 4:
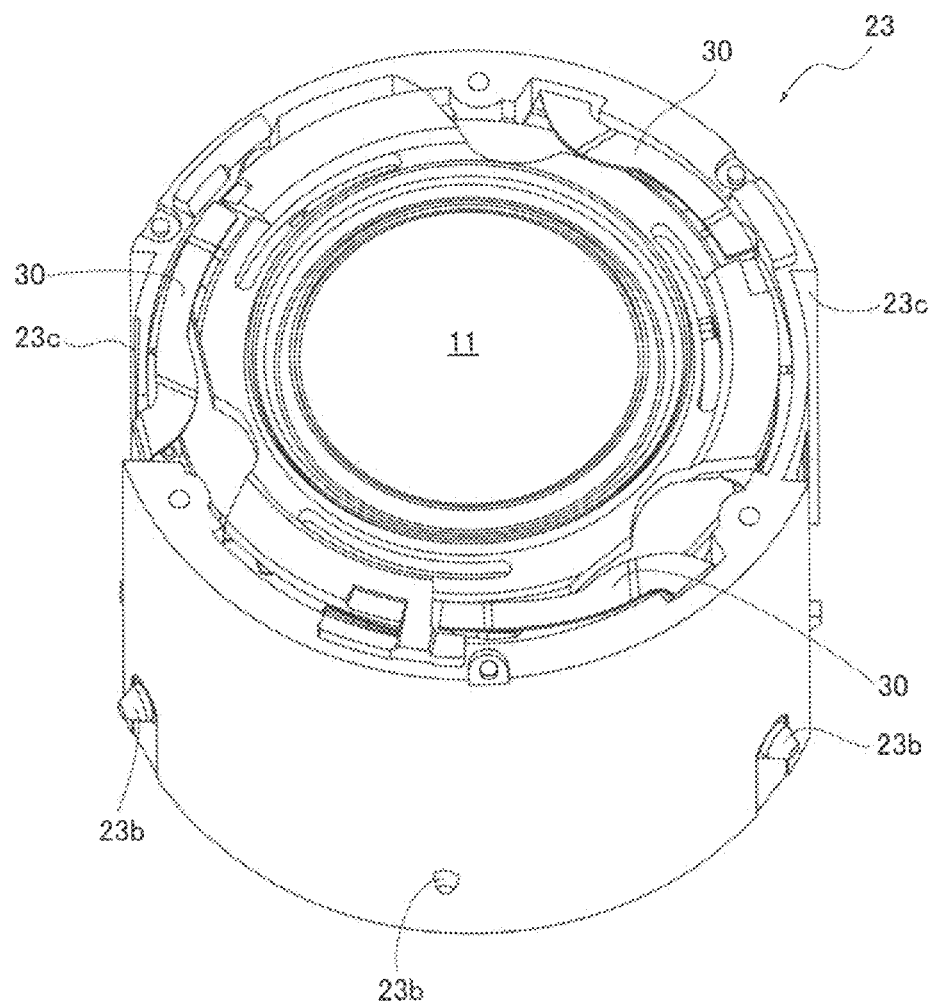
FIG. 4 is a perspective view of a first lens frame 21 and a second lens frame 22 incorporated into a moving cylinder 23.

The moving cylinder 23 includes cam followers 23b and straight grooves 23c on an outer circumference in FIG. 4.

Figure 5:
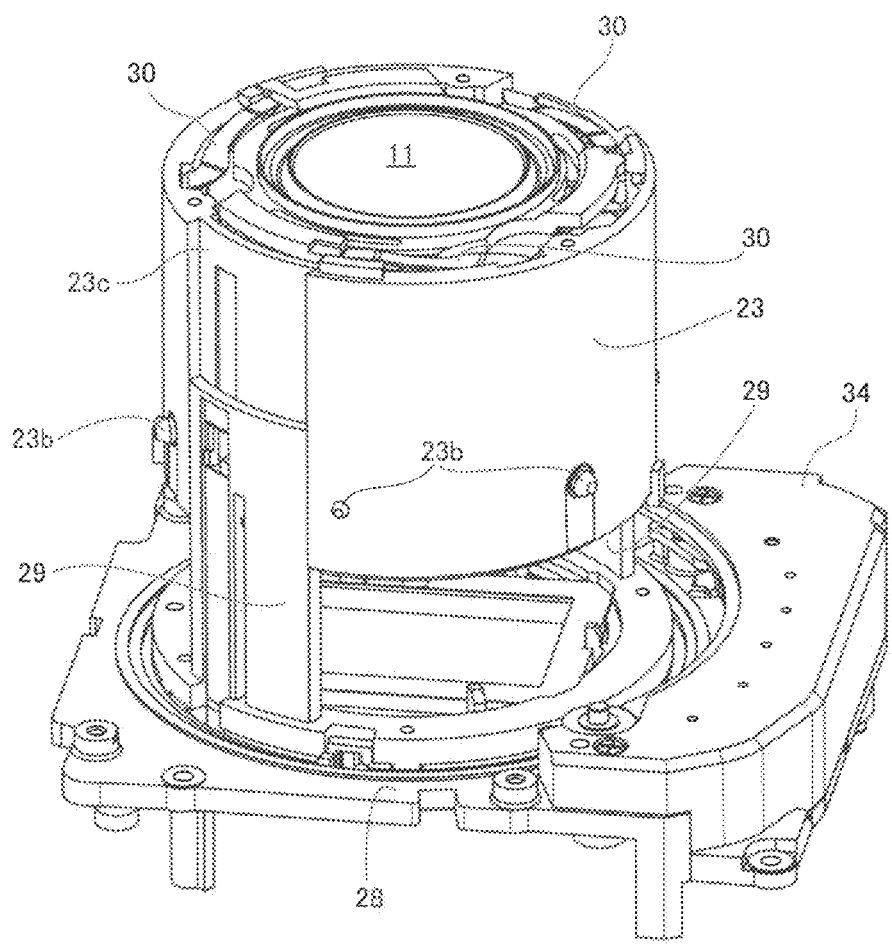
FIG. 5 is a perspective view of the moving cylinder 23 when it is set to be directly movable toward a base 28 by a liner 29.

Each of the cam followers 23b is protruded from the outer circumference to engage with the cam groove 24c of the rotary cylinder 24 in FIG. 3. Six cam followers 23b are provided circumferentially (only three shown in FIG. 4) and six cam grooves 24c are provided in FIG. 3 in the present embodiment. The straight grooves 23c are formed in a concave shape extending in the optical axis direction and they are paired in the present embodiment. In FIG. 5 the liners 29 in a plate form extend in the optical axis direction from the base 28 and are paired in accordance with the straight grooves 23c, and slidably fitted into the straight grooves 23c. Thus, the moving cylinder 23 is movable in the optical axis direction relative to the base 28 and the fixed cylinder 25 while prevented from rotating around the optical axis OA. Therefore, the moving cylinder 23 can move straight relative to the base 28 and the fixed cylinder 25 in the optical axis direction in accordance with the rotary position of the rotary cylinder 24 rotating relative to the fixed cylinder 25, following the cam trajectory of the cam grooves 24c of the rotary cylinder 24 engaging with the cam followers 23b.

As shown in FIGS. 2A, 2B and FIG. 7, the moving cylinder 23 includes near the flange 23a a ring-like groove 23d circumferentially extending along a plane orthogonal to the optical axis OA and having an open end 23e to the image plane side of the optical axis direction.

As described above, the first lens group 11, first lens frame 21 and shutter and diaphragm unit 13 are accommodated in the front space of the flange 23a of the moving cylinder 23. The shutter and diaphragm unit 13 is pressed by the flange 23a, the first lens frame 21 holding the first lens group 11 is contained on the subject side of the shutter and diaphragm unit 13 and the spring bearing 31 surrounds them. The first lens frame 21 is connected at a circumferential edge with the connection frame 27 and pressed by the blade springs 30 (FIG. 4) to the spring bearing 31 from the subject side. A stepped frame 32 is provided to surround the front circumferential edge of the first lens group 11 or the outer position of an effective area.

Further, the second lens frame 22 and the rotary cam unit 26 are accommodated in the back space of the flange 23a of the moving cylinder 23, as described above. The moving cylinder 23 includes three guide shafts, first guide shaft 51, second guide shaft 52, and third guide shaft 53 which are placed with a predetermined interval around the optical axis OA and extend from the flange 23a to the optical axis direction to position the second lens frame 22 in the back space. In the present embodiment the second and third guide shafts 52, 53 are disposed to be line symmetric relative to a direction from the first guide shaft 51 to the optical axis OA in FIG. 6. In the flange 23a an end 55a of a later-described second bias element 55 is fixed between the first and second guide shafts 51, 52 and between the second and third guide shafts 52, 53. Also, in this space a first rotary cam cylinder 56 and a second rotary cam cylinder 57 constituting the rotary cam unit 26 are provided to move the second lens frame 22 in the moving cylinder 23 as shown in FIGS. 8, 9.

Figure 8:
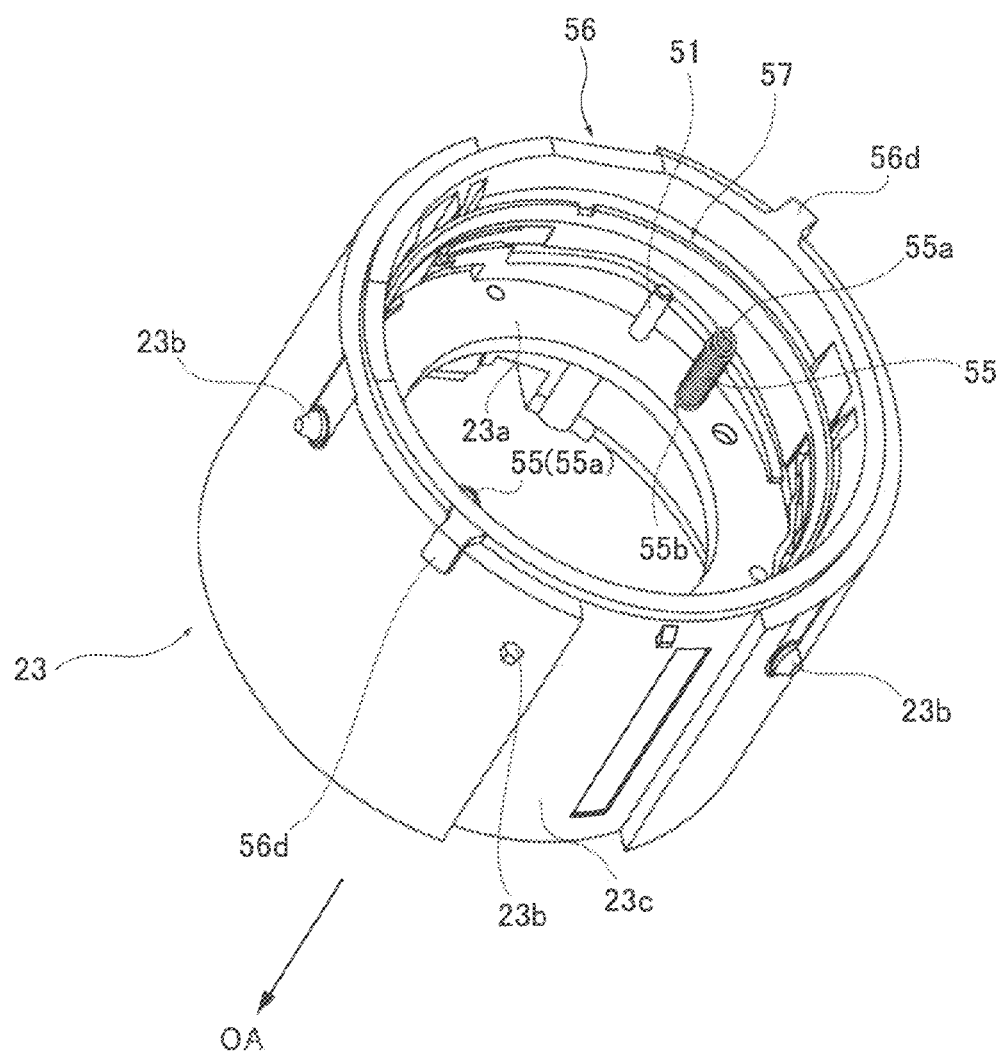
FIG. 8 is a perspective view of the moving cylinder 23 incorporating a cylinder of a second rotary cam cylinder 57 fit into a first rotary cam cylinder 56.
Figure 11A:
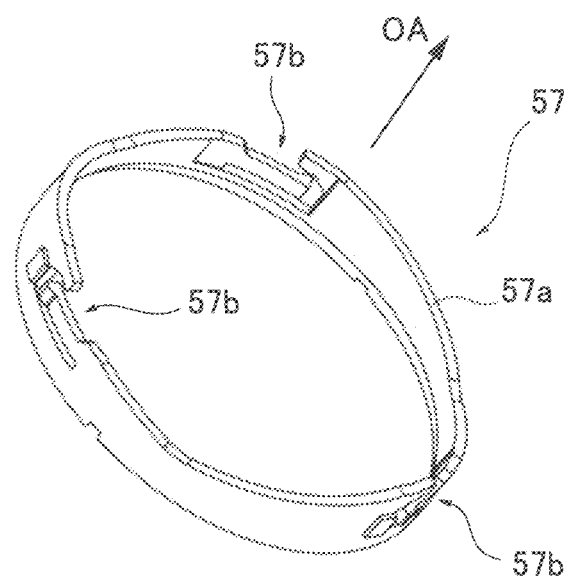
Figure 11B:
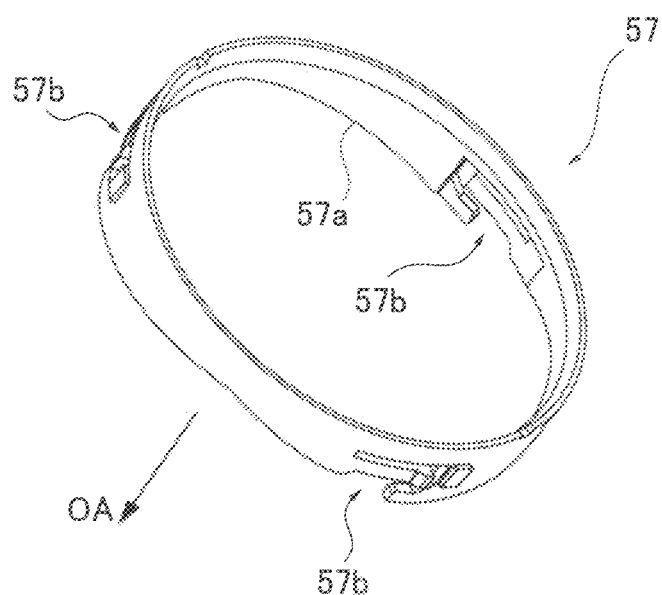
FIG. 11B is the same seen from the image plane.

In FIG. 8 the first rotary cam cylinder 56 is formed to be fitted into or inscribed in the moving cylinder 23 and includes a ring-like concave 56a on the inner circumference. A subject-side (top side in FIG. 10) edge of the ring-like concave 56a forms a cam face 56b and it includes a rotary engaging portion 56c at a circumferential predetermined position. Also, the first rotary cam cylinder 56 includes first key protrusions 56d and second key protrusions 56e on the outer circumference. Each of the first key protrusions 56d has an L-shape cross section orthogonal to the outer circumference and protrudes along the plane orthogonal to the optical axis OA in the radial direction from the image-side end (downward in FIG. 10) and then extends to the subject side (upward in FIG. 10), to stride over the image-side end of the moving cylinder 23. The top end portion thereof is extendable along the outer circumference of the first rotary cam cylinder 56 (FIG. 8) to engage with the straight grooves 24b (FIG. 3) of the rotary cylinder 24. Because of this, the first rotary cam cylinder 56 is integrally rotated with the rotary cylinder 24 around the optical axis OA in the moving cylinder 23 and relatively movable to the rotary cylinder 24 in the optical axis direction.

The second key protrusions 56e radially extend from the subject-side end of the outer circumference of the first rotary cam cylinder 56 to engage with the ring-like grooves 23d via the open end of the moving cylinder 23 (FIGS. 2, 7). Thus, the first rotary cam cylinder 56 is relatively rotatable with the moving cylinder 23 while prevented from moving in the optical axis direction.

Figure 6:
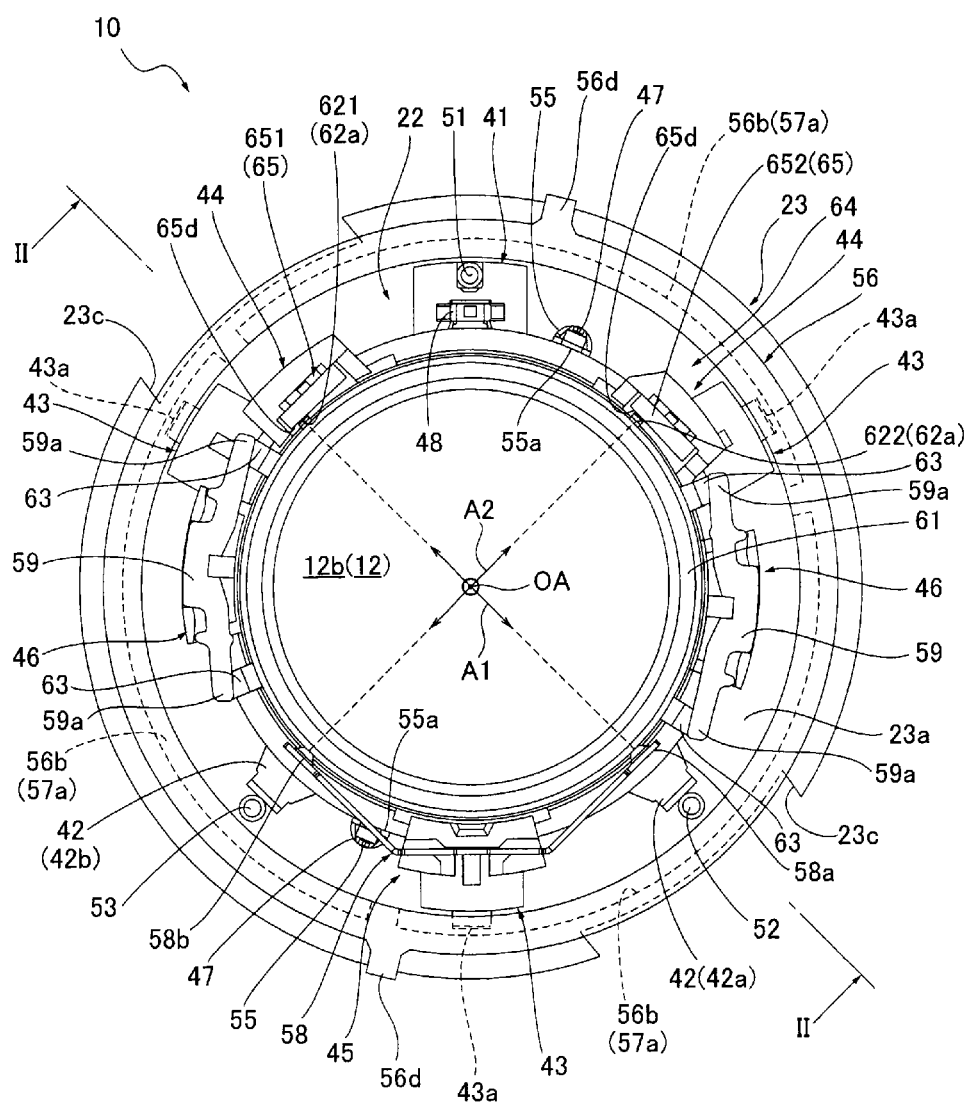
FIG. 6 is a plan view of the second lens frame 22 contained in a space at the back (image plane side) of a flange 23a of the moving cylinder 23, seen from the image plane in an optical axis direction OA.
Figure 12:
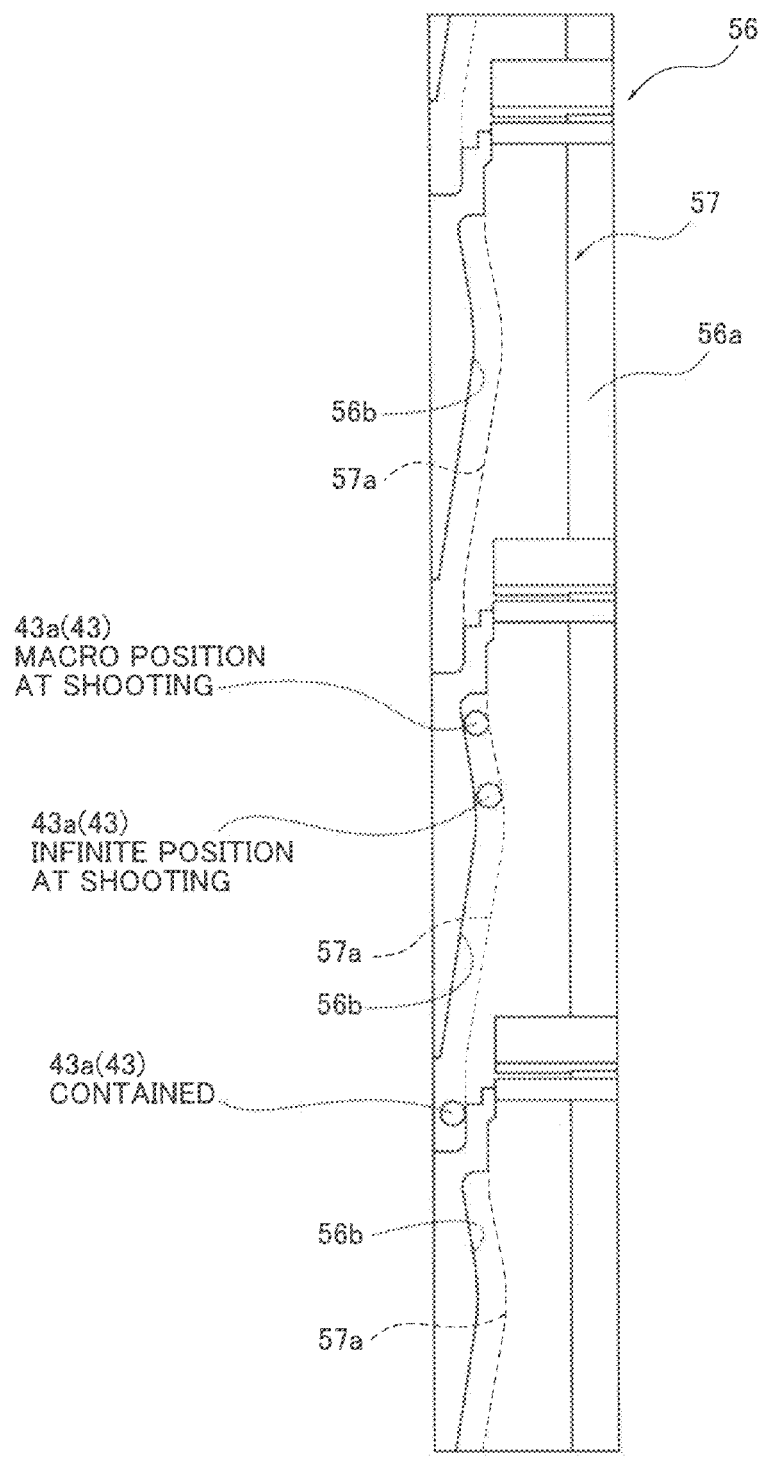
FIG. 12 is an exploded view of a cam groove formed in the cylinder including the first and second rotary cam cylinders 56, 57.

The second rotary cam cylinder 57 is placed in the ring-like concave 56a of the first rotary cam cylinder 56 (FIG. 9) and is of a size to be inscribed with the first rotary cam cylinder 56 (FIGS. 8, 9). It includes an auxiliary cam face 57a at an image-plane side edge and rotary engaging elements 57b on the circumference wall at a predetermined position. The second rotary cam cylinder 57 is mounted in the first rotary cam cylinder 56 by fitting the image-plane side end into the ring-like concave 56a to allow the auxiliary cam face 57a to face the cam face 56b and engaging the rotary engaging element 57b with the rotary engaging element 56c (FIGS. 8, 9). In the cylinder (FIG. 9) including the second rotary cam cylinder 57 fitted into the first rotary cam cylinder 56, the cam face 56b and the auxiliary cam face 57a face each other in the optical axis direction in the ring-like concave 56a of the first rotary cam cylinder 56, forming, on the inner circumference, a cam groove with which a protruded guide 43 or a cam protrusion 43a is engaged as shown in FIG. 12. This cylinder provided in the back space of the flange 23a is integrally rotatable with the rotary cylinder 24 around the optical axis OA and prevented from relatively moving to the moving cylinder 23 in the optical axis direction, as described above. In that space the second lens group 12 is held in the second lens frame 22 supported in the moving cylinder 23 via the rotary cam unit 26 (FIGS. 2, 6).

The second lens frame 22 in FIG. 13 in a cylindrical form has a stepped shape with a backside (image plane side, top side in FIG. 13) end having a larger outer diameter. The outer diameter thereof is set to be insertable into the backside of the flange 23a of the moving cylinder 23 but not insertable into the inside (inner diameter defined by the flange 23a) of the flange 23a (FIGS. 2, 6).

The second lens frame 22 includes a through hole 22a along the optical axis OA to hold the second lens group 12. The backside of the through hole 22a is a large inner diameter portion to fit with a later-described ring 66 and the adjustment lens frame 61 and the front side thereof is a small inner diameter portion to fit with the fixed lens 12a of the second lens group 12 (FIG. 2). Because of this, the central axis line of the through hole 22a is the optical axis of the second lens group 12 which coincides with the optical axis OA. The front side of the small inner diameter portion or the front end of the second lens frame 22 is provided with an inner protrusion 22b to prevent the second lens group 12 including the fixed lens 12a from falling off. For accommodating the second lens group 12 in the second lens frame 22, the fixed lens 12a, ring 66, and adjustment lens frame holding the adjustment lens 12b are inserted into the through hole 22a in this order from the opening of the large inner diameter portion, which is described later in detail.

The second lens frame 22 further includes a bias element holder 41, two protrusions 42, three protruded guides 43, two cam bearings 44, a radial bias element holder 45, two axial bias element holders 46 and two protrusions 47.

Figure 14:
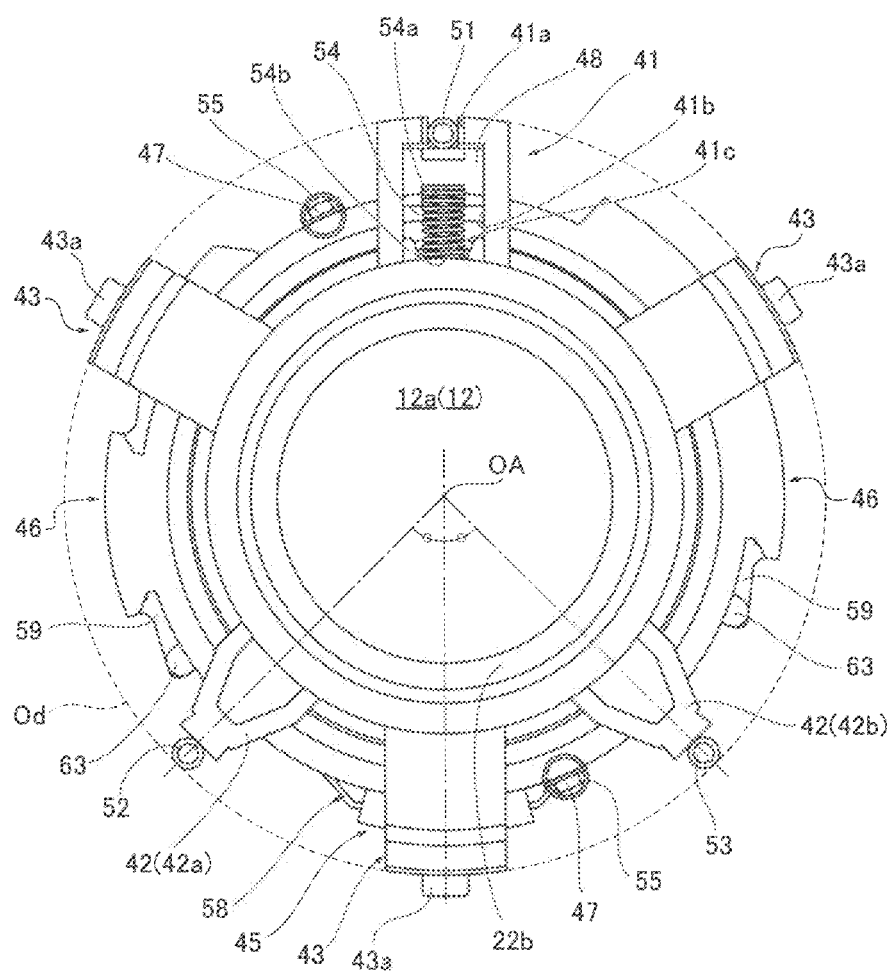
FIG. 14 is a plan view of a structure to contain the second lens frame 22 in the back space (image plane side) of a flange 23a of the moving cylinder 23 without the moving cylinder 23, seen from the subject.
Figure 15:
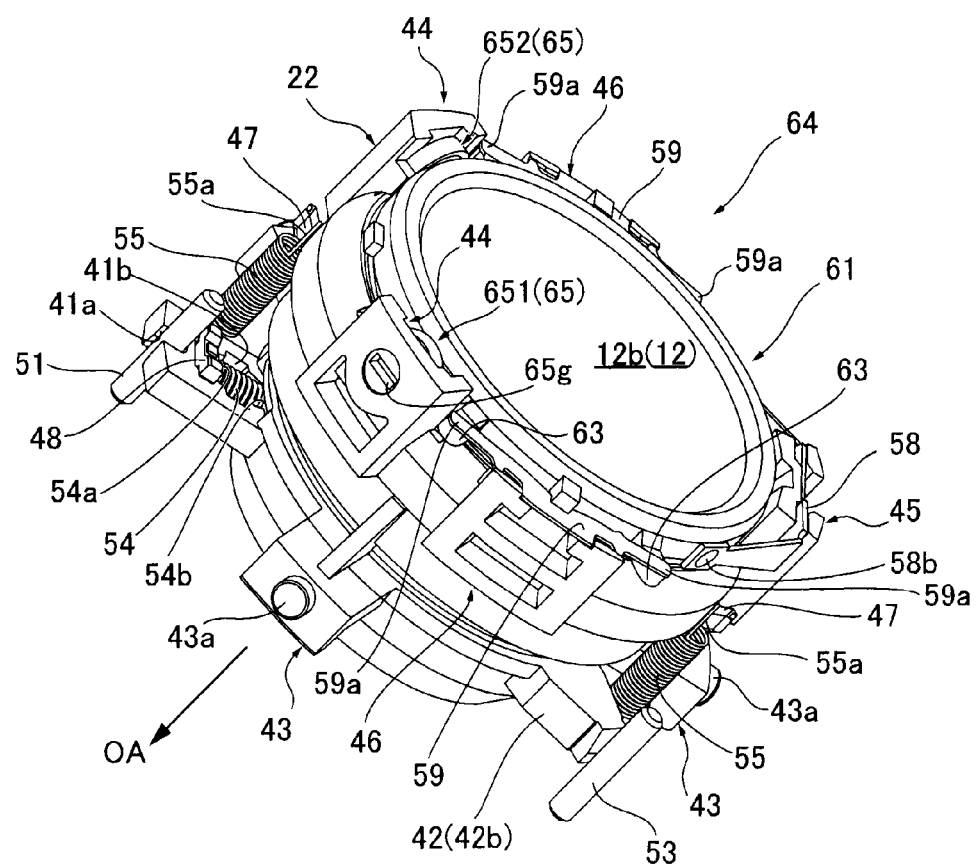
FIG. 15 is a perspective view of the structure to contain the second lens frame 22 in the back space of the flange 23a of the moving cylinder 23 without the moving cylinder 23.
Figure 16:
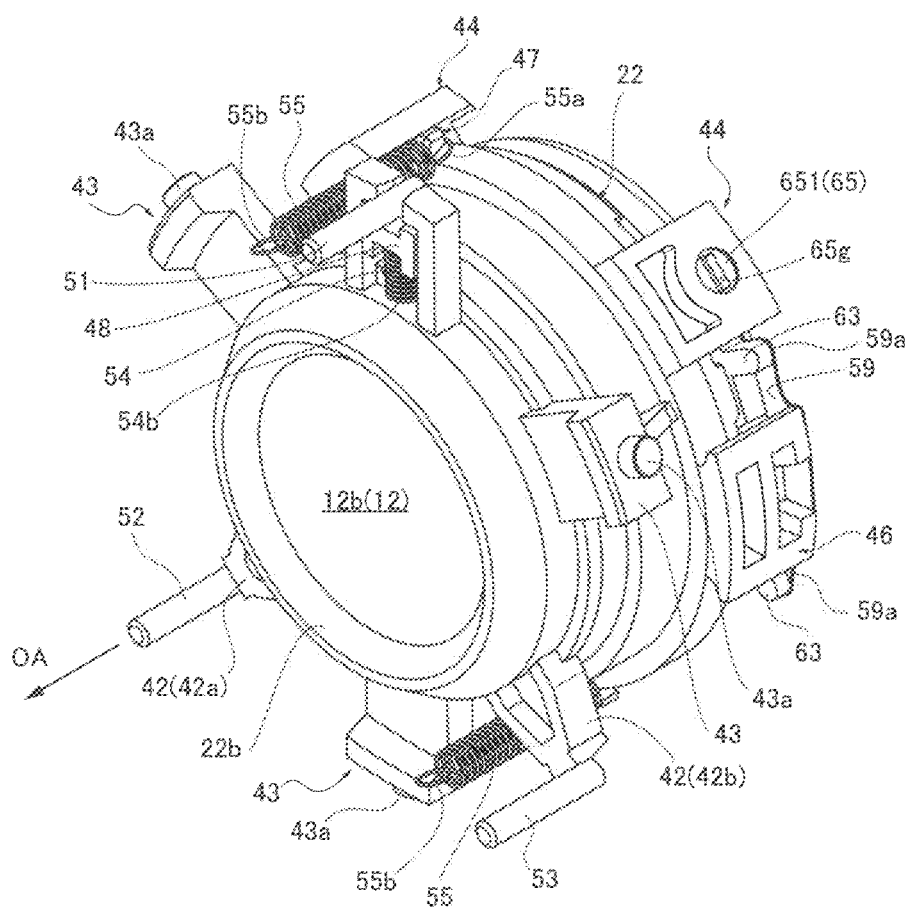
FIG. 16 is a different view of the structure in FIG. 15.

The bias element holder 41 in a plate form extends in the radial direction from the outer circumference and includes a concave 41a and a through hole 41b. The end of the bias element holder 41 is cut off to form the concave 41a which has a U-shape cross section along the plane orthogonal to the optical axis OA or the axial line of the second lens frame 22 to slidably receive the first guide shaft 51 on the flange 23a of the moving cylinder 23 (FIG. 14 to FIG. 16). The through hole 41b penetrates through the bias element holder 41 in the optical axis direction, has a rectangular cross section to hold a later described spring bearing 48 and a first bias element 54, and includes a protrusion 41c at an inner end or the outer circumference of the second lens frame 22. The front sides (subject side) of the concave 41a and the through hole 41b communicate with each other (FIGS. 14, 16).

The spring bearing 48 held in the through hole 41b as shown in FIG. 14 to FIG. 16 is movable at the communicated portion in the radial direction of the second lens frame 22 to abut with the first guide shaft 51 in the concave 41a and one end 54a of the first bias element 54. The spring bearing 48 is provided for properly transmitting bias force of the first bias element 54 to the first guide shaft 51. The first bias element 54 biases the spring bearing 48 to the first guide shaft 51. In the present embodiment the first bias element 54 is a compressed coil spring such that one end 54a abuts with the first guide shaft 51 through the communicated portion and the other end 54b abuts with the inner end of the through hole 41b while receiving the protrusion 41c. Note that the first bias element 54 should not be limited to the compressed coil spring, and alternatively, it can be a blade spring or a torsion coil spring as long as it can function as above.

The two protrusions 42 (42a, 42b) are in a columnar shape radially extending from the outer circumference of the second lens frame 22 to hold the first guide shaft 51 in the concave 41a of the bias element holder 41. The protrusion 42a abuts with the second guide shaft 52 and the other protrusion 42b abuts with the third guide shaft 53 while the second lens frame 22 is accommodated in the back space of the flange 23a of the moving cylinder 23 (FIG. 6 and else). The two protrusions 42a, 42b are line-symmetrically arranged relative to the bias direction of the first bias element 54 in the through hole 41b of the bias element holder 41 or a direction connecting the first guide shaft 51 and the optical axis OA in the present embodiment, as shown in FIG. 14. The protrusions 42a, 42b are provided to position the second lens frame 22 on the plane orthogonal to the optical axis OA.

The three protruded guides 43 are columnar radially extending from the outer circumference of the second lens frame 22 and each include a cam protrusion 43a at an end which can engage with the cam groove formed by the first rotary cam cylinder 56 and the second rotary cam cylinder 57 in FIG. 6.

The two cam bearings 44 are in a plate form extending from the back edge of the second lens frame 22 in the optical axis direction and provided with a predetermined interval in the circumferential direction of the second lens frame 22 to correspond to the positions of end portions 62 of the adjustment lens frame 61. The cam bearings 44 support the adjusting cams 65 and constitute the aligning mechanism 64. The cam bearings 44 each include a hole 44a in the radial direction of the second lens frame 22, a concave 44b surrounding the hole 44a, a convex 44c formed at the downside (subject side) of the hole 44a, and a face 44 surrounding the concave 44b. The axial direction of the hole 44a is set to the direction to the optical axis OA along the plane orthogonal to the optical axis OA. The face 44d is orthogonal to the axial direction of the hole 44a.

The radial bias element holder 45 is in a plate form extending from the back edge of the second lens frame 22 in the optical axis direction to hold a radial bias element 58 (FIG. 6). In the present embodiment it includes a slit 45a to be open to the circumferential ends of the second lens frame 22 (around the optical axis OA) and to the image-plane side (upward in FIG. 13) of the optical axis direction. As shown in FIG. 6 and FIG. 15, the radial bias element 58 is configured to provide a bias force to the adjustment lens frame 61 along the plane orthogonal to the optical axis OA. That is, it functions to bias the adjustment lens frame 61 to one of the adjusting cams 651 and to the other 652 along the plane orthogonal to the optical axis OA. According to the first embodiment, the radial bias element 58 is made of a single blade spring and biases the adjustment lens frame 61 to the adjusting cam 651 at one end 58a and to the other adjusting cam 652 at the other end 58b. Thus, both ends 58a, 58b function as two radial bias means. Note that the structure of the radial bias element 58 should not be limited to the above example. Alternatively, it can be two separate spring elements for the above two functions.

In FIG. 13 the two axial bias element holders 46 are each made of a plate extending from the back end of the second lens frame 22 to the optical axis direction. They are provided with a predetermined interval circumferentially around the second lens frame 22 or the optical axis OA. In the first embodiment they are symmetrically positioned relative to the optical axis OA (FIG. 6). Axial bias elements 59 in FIG. 6 are each attached to each of the axial bias element holders 46 to bias the adjustment lens frame 61 to the subject side of the optical axis direction for the purpose of preventing a change in the relative positions of the fixed lens 12a and the adjustment lens 12b or a distance therebetween in the optical axis direction. They are each made of a blade spring as shown in FIG. 14 to FIG. 16. Note that the structure of the axial bias elements 59 should not to be limited to the above example as long as they functions as above.

Figure 13A:
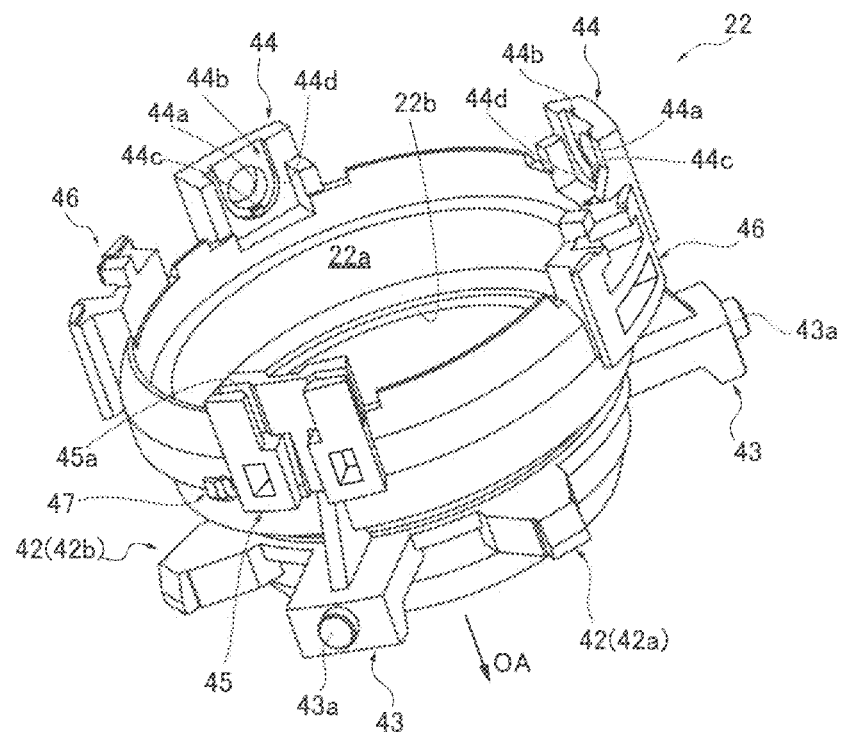
FIG. 13A is a perspective view of the second lens frame 22 when a radial bias element holder 45 is positioned at front and FIG. 13B is the same when a bias element holder 41 is positioned at front.
Figure 13B:
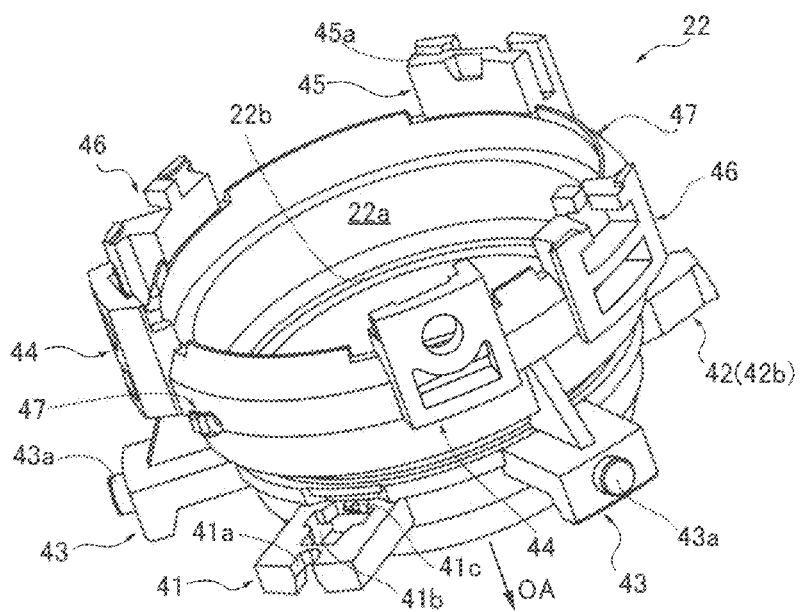

The two protrusions in a plate form 47 have an L-shape cross section along the optical axis OA and radially protrude from the outer circumference of the second lens frame 22 and extend upward in FIGS. 13A, 13B. They are provided with a predetermined interval circumferentially around the second lens frame 22 and symmetrical relative to the optical axis OA in the first embodiment (FIG. 6). One end 55a of the second bias element 55 is engaged with each protrusion 47 (FIG. 15).

The second bias element 55 is a compression coil spring configured to bias the second lens frame 22 to the flange 23a of the moving cylinder 23 in the first embodiment (FIGS. 15, 16). The second bias element 55 should not be limited to the above compression coil spring, and alternatively it can be a blade spring or a torsion coil spring as long as it has the above function.

In FIGS. 2A, 2B the second lens frame 22 is fitted with the second lens group 12 to contact the fixed lens 12a in the through hole 22a by pressing the ring 66 into the small inner diameter portion. The ring 66 is configured to be fitted into the large inner diameter portion of the through hole 22a to set the relative position of or interval between the fixed lens 12a and the adjustment lens 12b of the second lens group 12 in the second lens frame 22 in the optical axis direction.

Figure 17A:
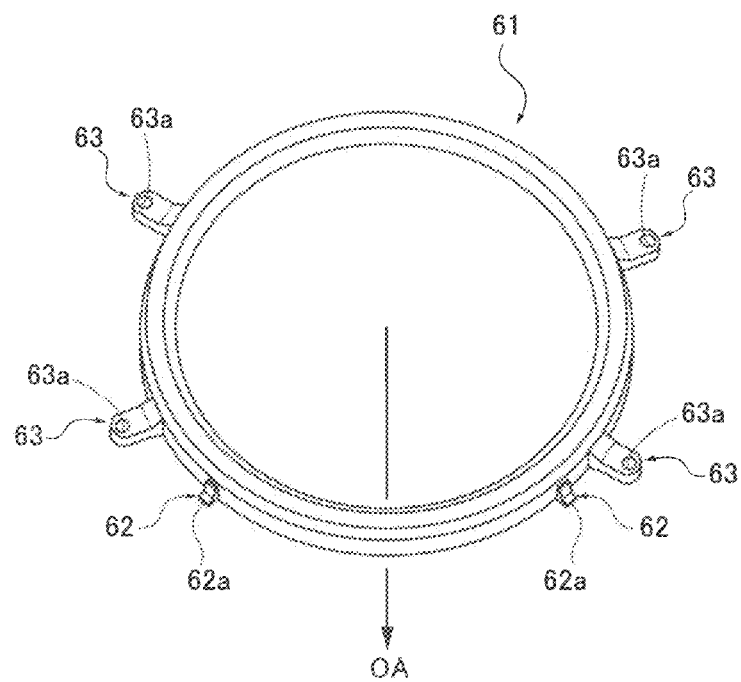
FIG. 17A is a perspective view of an adjustment lens frame 61 seen from the image plane and FIG. 17B is the same seen from the subject.
Figure 17B:
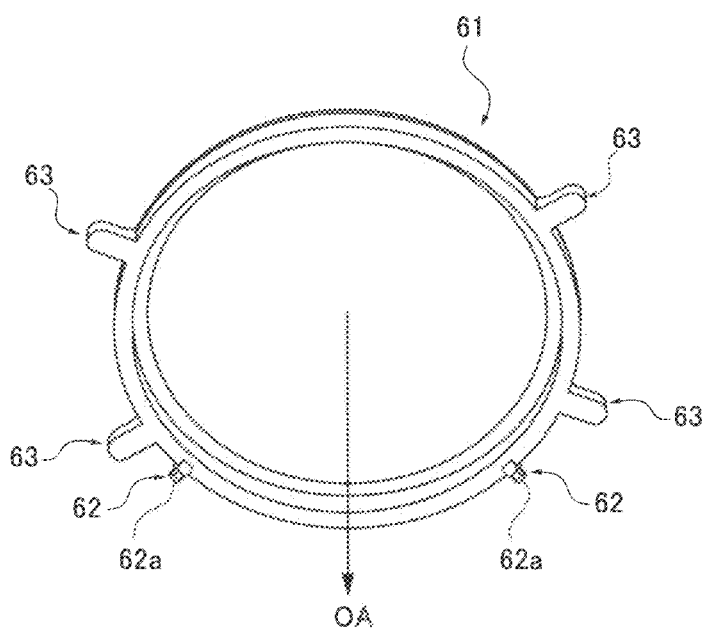
Figure 19:
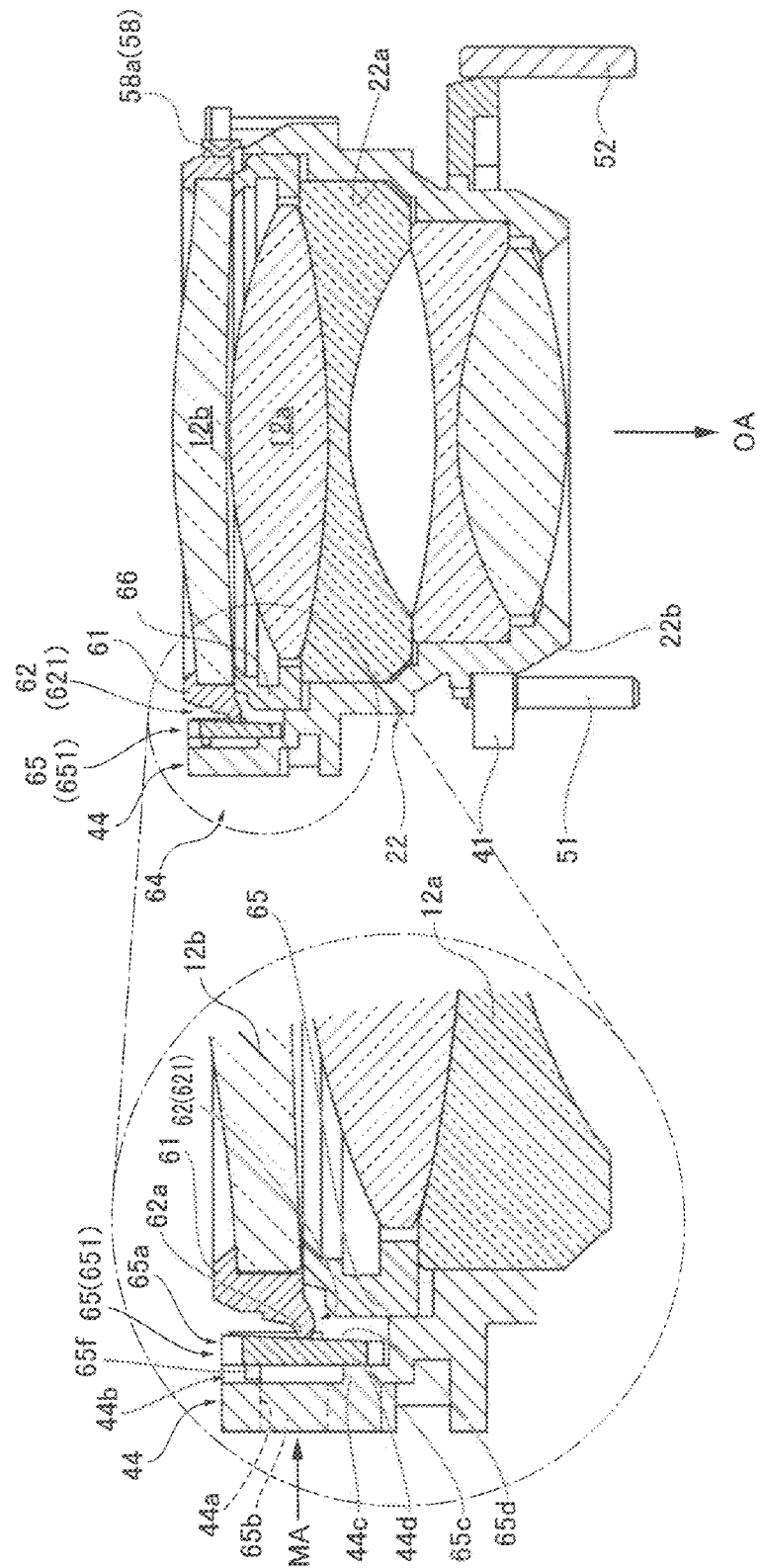
FIG. 19 is a cross sectional view of the structure to contain the second lens frame 22 in the back space of the flange 23a of the moving cylinder 23 along the II to II line in FIG. 6.

The adjustment lens 12b abutting with the ring 66 is held in the adjustment lens frame 61 inside the second lens frame 22. The adjustment lens frame 61 in FIGS. 17A, 17B is formed in a ring shape to hold the adjustment lens 12b inside (FIG. 15 and FIG. 19) and includes two end portions 62 and four bias bearings 63. The two end portions 62 radially protrude from the outer circumference of the adjustment lens frame 61 and have protruded edges 62a (FIG. 19). The end portions 62 are provided with a predetermined interval circumferentially around the second lens frame 22 so that the protruded edges 62a come at a predetermined position relative to the respective cam bearings 44 holding the adjusting cams 65 as described later in detail (FIG. 6). In the first embodiment the lines connecting the protruded edges 62a and the optical axis OA are orthogonal to each other on the plane orthogonal to the optical axis OA (FIG. 6).

The four bias bearings 63 protrude from the outer circumference of the adjustment lens frame 61 and each include a face 63a on the image plane side (upward in FIG. 17A) to receive a bias force from the axial bias elements 59 (FIG. 6 and FIG. 15) in the optical axis direction. The four bias bearings 63 are provided with a predetermined interval circumferentially around the second lens frame 22 or the optical axis OA so that the respective faces 63a come at predetermined positions relative to the axial bias elements 59 held in the axial bias element holders 46. In the first embodiment they are point-symmetrical relative to the optical axis OA (FIG. 6).

The adjustment lens frame 61 is held in the second lens frame 22 via the aligning mechanism 64 and can move or adjust its position therein along the plane orthogonal to the optical axis OA. The aligning mechanism 64 includes the adjusting cams 65 (FIG. 6) received by the cam bearings 44.

Figure 18A:
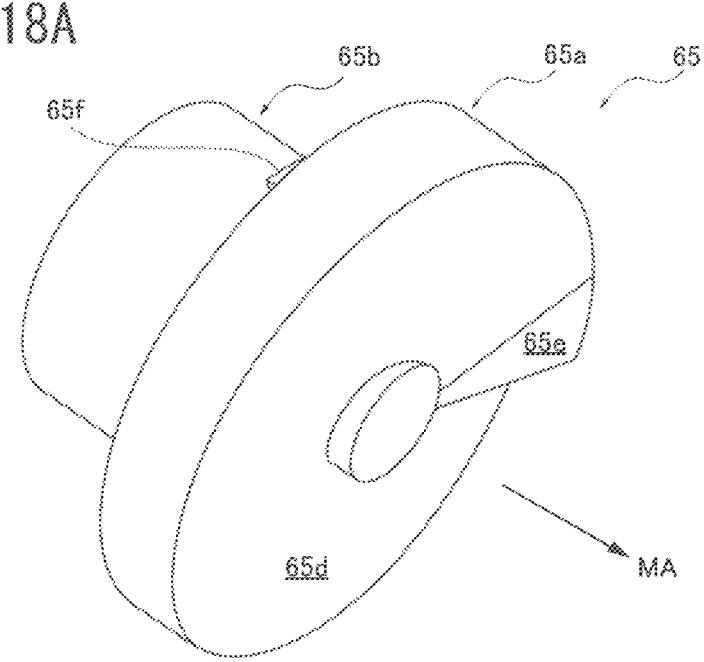
FIG. 18A is a perspective view of an adjusting cam 65 seen from the optical axis OA and FIG. 18B is the same seen from the backside of FIG. 18A.
Figure 18B:
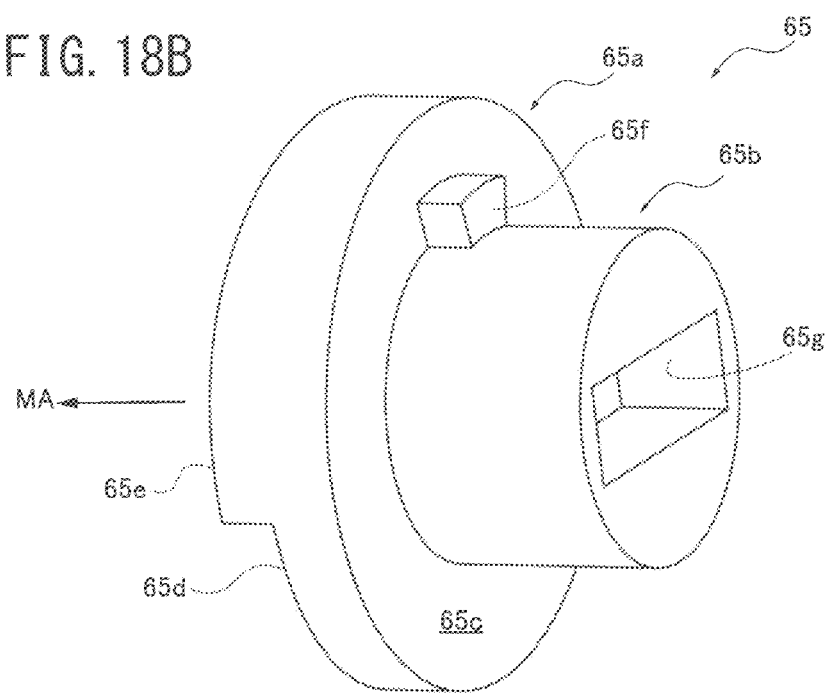

Each of the adjusting cams 65 as shown in FIGS. 18A, 18B is columnar with a step consisting of a large diameter portion 65a and a small diameter portion 65b having the same central axis line MA. The large diameter portion 65a is larger in diameter than the concave 44b (FIG. 13) of the cam bearing 44 of the second lens frame 22 and the back face 65c (facing to the small diameter portion 65b) thereof is orthogonal to the central axis line MA to contact with the face 44d of the cam bearing 44. The small diameter portion 65b is rotatably fitted into the hole 44a of the cam bearing 44.

The front face of the large diameter portion 65a includes a cam face 65d in a hellicoidal form to continuously change the thickness or height of the large diameter portion 65a along the central axis line MA. In other words, the cam face 65d is a flat face inclined to the central axis line MA, to gradually change the distance to the face 65c or the position in the central axis line direction. In the first embodiment the front face of the large diameter portion 65a also includes a flat face 65e extending in a rotary direction around the central axis line MA to maintain the height of one end of the cam face 65d at a highest position.

Further, the back face 65c of the large diameter portion 65a includes a convex 65f protruding from the back face 65c in the central axis line direction to continue with the outer circumference of the small diameter portion 65b. The convex 65f is configured to be engageable with the convex 44c of the cam bearing 44 (FIG. 13) in the rotary direction around the central axis line MA (FIG. 20) while the small diameter portion 65b is fitted into the hole 44a of the cam bearing 44 of the second lens frame 22 (FIG. 15). Thus, the rotatable range of the adjusting cam 65 is restricted in the cam bearing 44 by the convex 65f and the convex 44c. Accordingly, the convexes 44c and 65f function as a rotation restricting element. The rotatable range is set in accordance with the positional relation of the protruded edges 62a of the end portions 62 and the cam faces 65d and is about 300 angles around the central axis line MA in the first embodiment.

Further, the end of the small diameter portion 65b of each adjusting cam 65 includes a hole 65g to be fitted with a jig for rotating the adjusting cam 65 and being a rectangular hole in the first embodiment.

The adjustment lens frame 61 as shown in FIG. 19 is inserted into the through hole 22a of the second lens frame 22 fitted with the ring 66 while holding the adjustment lens 12b of the second lens group 12. In the second lens frame 22 the small diameter portions 65b of the adjusting cams 65 are inserted into the holes 44a of the cam bearings 44 so that the faces 44c are brought in contact with the back faces 65c of the large diameter portions 65a, thereby disposing the adjusting cams 65. The adjustment lens frame 61 is positioned in the second lens frame 22 so that the cam face 65d of one of the adjusting cams 651 contacts with the protruded edge 62a of one end portion 621 and the cam face 65d of the other adjusting cam 652 contacts with the protruded edge 62a of the other end portion 622 at respective predetermined positions relative to the second lens frame 22 (FIG. 6).

The axial bias elements 59 are attached to the two axial bias element holders 46 of the second lens frame 22, respectively. The axial bias elements 59 are provided to press the adjustment lens frame 61 to the subject side of the optical axis direction relative to the second lens frame 22. In the first embodiment the ends 59a thereof press the faces 63a of the bias bearings 63 to the subject side (FIG. 6 and FIG. 15). Thereby, the adjustment lens frame 61 holding the adjustment lens 12b is continuously pressed by the ring 66 to the subject and the ring 66 is continuously pressed by the fixed lens 12a to the subject in the through hole 22a of the second lens frame 22.

The radial bias element 58 is attached to the radial bias element holder 45 of the second lens frame 22 (FIG. 6 and FIG. 15). The radial bias element 58 in FIG. 6 is configured to press the adjustment lens frame 61 with the ends 58a, 58b to the optical axis OA in a first direction A1 and in a second direction A2. The first direction A1 is the direction of a line connecting one end 58a, the engaging portion of the protruded edge 62a of the one end portion 621 and the cam face 65d of the adjusting cam 651, and the optical axis OA while the second direction A2 is the direction of a line connecting the other end 58b, the engaging portion of the protruded edges 62a of the adjusting cam 652 and the cam face 65d of the adjusting cam 652, and the optical axis OA. As described above, the axial direction of each hole 44a is set to the optical axis direction along the plane orthogonal to the optical axis OA so that the adjustment lens frame 61 is biased by the radial bias element 58 in the same direction as the central axis line direction of the corresponding adjusting cam 65.

Accordingly, in the second lens frame 22, supported between the one end 58a of the radial bias element 58 and the cam face 65d of the adjusting cam 651 (FIG. 19), the adjustment lens frame 61 is positioned in the central axis line direction of the adjusting cam 651 or the first direction A1. Also, supported between the other end 58b of the radial bias element 58 and the cam face 65d of the adjusting cam 652, the adjustment lens frame 61 is positioned in the central axis line direction of the adjusting cam 652 or the second direction A2.

Figure 20A:
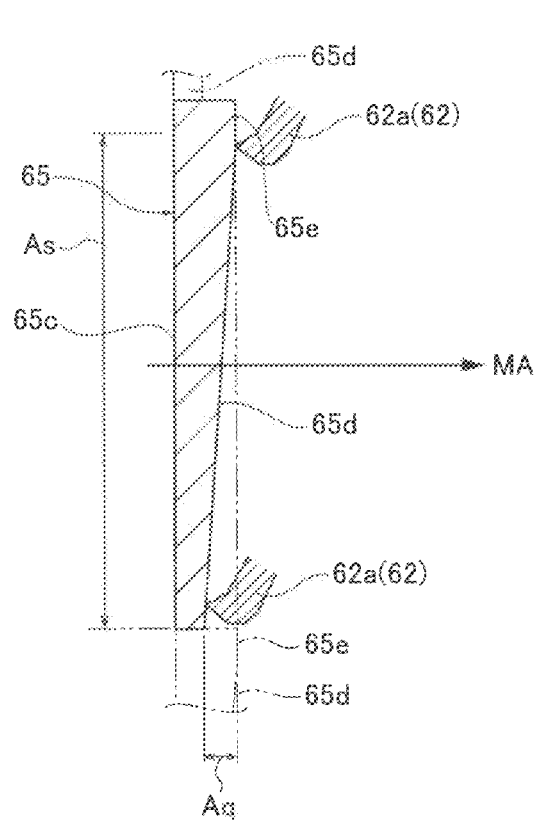
FIG. 20A is an exploded view of a cam face 65d of the adjusting cam 65 around the central axis line MA and FIG. 20B shows the rotary position of the adjusting cam 65 in a cam bearing 44 when the cam face 65d abuts with a protruded edge 62a (62)

Herein, the protruded edges 62a of the end portions 62 of the adjustment lens frame 61 abut with the corresponding cam faces 65d of the adjusting cams 65 at predetermined positions relative to the second lens frame 22 or the cam bearings 44. Further, the faces 44d of the cam bearings 44 abut with the faces 65c of the adjusting cams (FIG. 19) and the adjusting cams 65 abut with the cam faces 65d are rotatably provided on the back faces of the cam bearings 44. Thus, at the protruded edge 62a of the end portion 62 of the second lens frame 22, the thickness of the large diameter portion 65a or the position in the first or second direction A1, A2 is changed in accordance with the rotary position of the adjusting cams 65 around the central axis line MA (FIG. 19). FIG. 20A shows the cam face 65d of the adjusting cam 65 around the central axis line MA and FIG. 20B shows the rotary position of the adjusting cam 65 relative to the protruded edge 62a of the end portion 62 in the cam bearing 44.

Figure 20B:
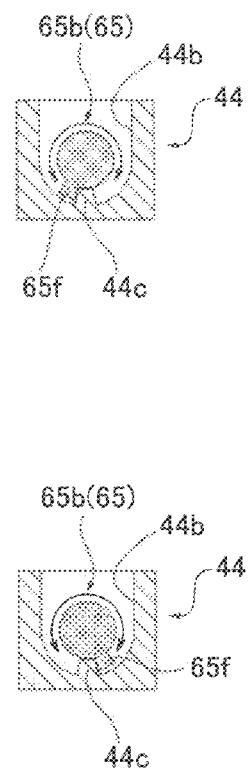

In FIG. 20B each adjusting cam 65 is rotatable in the cam bearing 44 to contact with one end of the convex 44c at one end of the convex 65f (top drawing) and with the other end of the convex 44c at the other end of the convex 65f (bottom drawing). In contact with one end of the convex 44c at one end of the convex 65f, the protruded edge 62a of the end portion 62 abuts with the topmost position of the cam face 65d of the adjusting cam 65 where the thickness is largest. In contact with the other end of the convex 44c at the other end of the convex 65f, the protruded edge 62a of the end portion 62 abuts with the bottommost position of the cam face 65d where the thickness is smallest.

Because of this, by properly rotating the adjusting cams 65 in the cam bearings 44, the positions where the cam faces 65d receive the protruded edges 62a of the end portions 62 are changed. In accordance with the change, the adjusting cams 65 can be changed in position along the central axis line MA. Accordingly, following the track of the cam faces 65d, the position of the adjustment lens frame 61 can be adjusted relative to the second lens frame 22 in the first and second directions A1, A2 or on the plane orthogonal to the optical axis OA by rotating the adjusting cams 651, 652, respectively. The adjusting cams 65 define adjustment strokes in an angular range or the length (indicated by the code As in FIG. 20A) of the cam faces 65d in the rotary direction around the central axis line MA and define the maximum adjustment amount to be the change amount of the cam faces 65d or the change amount of the thickness (indicated by the code Aq in FIG. 20A) of the large diameter portions 65a in the central axis line direction. Thus, the adjusting cams 65 held in the cam bearings 44 and the radial bias element 58 movably hold the adjustment lens frame 61 holding the adjustment lens 12b along the plane orthogonal to the optical axis OA, and function as the aligning mechanism 64 which adjusts the position of the held adjustment lens frame 61 on the plane orthogonal to the optical axis OA. The aligning mechanism 64 converts the rotary operation of the adjusting cams 65 into a movement to the central axis line direction as the rotary axis for adjusting the position of the adjustment lens 12b.

The above-described structure is disposed inside the outermost diameter Od in FIG. 14. That is, the second lens frame 22 holds, inside the outermost diameter Od, the fixed lens 12a of the second lens group 12, ring 66, adjustment lens frame 61 holding the adjustment lens 12b, aligning mechanism 64 for the adjustment lens frame 61, radial bias element 58, and axial bias elements 59. The outermost diameter Od is a circle around the optical axis OA passing the furthest positions of the second lens frame 22 from the optical axis OA except for the cam protrusions 43a. The cam protrusions 43a are excluded since they engage with the cam grooves. Thus, by setting the outermost diameter Od to be smaller than the inner diameter of the cylinder of the second rotary cam cylinder 57 fitted into the first rotary cam cylinder 56 forming the cam grooves, the second lens frame 22 can be accommodated in the front space of the flange 23a of the moving cylinder 23.

Further, the second lens frame 22 in FIG. 6 is accommodated in the back space of the flange 23a of the moving cylinder 23 into which the first rotary cam cylinder 56 is fitted, with the first guide shaft 51 held in the concave 41a of the bias element holder 41, the one protrusion 42a abut with the second guide shaft 52, and the other protrusion 42b abut with the third guide shaft 53. In the bias element holder 41 the first bias element 54 biases the first guide shaft 51 via the spring bearing 48 so that the first guide shaft 51 and the second lens frame 22 move away from each other. Biased by the first bias element 54 with the force from the first guide shaft 51 fixed at the flange 23a, the second lens frame 22 is pressed to the second and third guide shafts 52, 53 via the protrusions 42. In other words, it is virtually pressed in three different directions to the first to third guide shafts 51 to 53 and positioned relative to the moving cylinder 23 along the plane orthogonal to the optical axis OA. Since the first guide shaft 51 is held in the concave 41a of the bias element holder 41, the second lens frame 22 is prevented from the relative rotation to the moving cylinder 23 around the optical axis OA. According to the first embodiment the second and third guide shafts 52, 53 are linear-symmetrically disposed in the direction to the optical axis OA from the first guide shaft 51 (FIG. 14). This makes it possible to equally distribute the bias force from the first bias element 54 to the second and third guide shafts 52, 53 and more stably position the second lens frame 22. Thus, the first to third guide shafts 51 to 53, bias element holder 41, first bias element 54, spring bearing 48, and both protrusions 42 constitute the positioning mechanism for the second lens frame 22 along the plane orthogonal to the optical axis OA relative to the moving cylinder 23.

In addition, in the second lens frame 22 the ends 55a (FIG. 7) of the second bias elements 55 are engaged with the two protrusions 47 and the other ends 55b are fixed to the flange 23a of the moving cylinder 23. The second lens frame 22 is biased by the second bias element 55 to the flange 23a (subject side) in the moving cylinder 23, pressing the cam protrusions 43a to the cam face 56b (FIG. 12) of the first rotary cam cylinder 56. And, the second rotary cam cylinder 57 fitted into the first rotary cam cylinder 56 is inserted into the moving cylinder 23, forming the cam grooves by the cam face 56b and the auxiliary cam face 57a to receive the cam protrusions 43a pressed to the cam face 56b. Thus, along with the rotation of the rotary cylinder 24 relative to the fixed cylinder 25, the second lens frame 22 is moved straight relative to the moving cylinder 23 in the optical axis direction or on the optical path (FIGS. 2A, 2B) in accordance with the rotary position of the cylinder consisting of the first and second rotary cam cylinders 56, 57, following the track of the cam face 56b. The second lens frame 22 can be moved straight while maintained at the adjusted position since the first guide shaft 51 is slidable in the concave 41a in the optical axis direction and the protrusions 42 are pressed to the second and third guide shafts 52, 53. Moreover, continuously biased by the second bias element 55 to the optical axis direction, the second lens frame 22 can be prevented from backlash during the straight movement and can be positioned more precisely relative to the first lens group 11 in the moving cylinder 23. Thus, the first rotary cam cylinder 56, cam face 56b, second rotary cam cylinder 57, auxiliary cam face 57a, and cam protrusions 43a constitute the rotary cam unit 26 for moving the second lens frame 22 straight to the moving cylinder 23 in the optical axis direction along with the rotation of the rotary cylinder 24 to the fixed cylinder 25 or base 28.

An example of the assembly of the lens barrel 10 is described in the following. However, how to assemble the lens barrel should not be limited to such an example.

First, the adjusting cams 65 are mounted in the cam bearings 44 of the second lens frame 22 and the adjustment lens frame 61 holding the fixed lens 12a, ring 66, and adjustment lens 12b are inserted into the through hole 22a. The radial bias element 58 is attached to the radial bias element holder 45 of the second lens frame 22 and the axial bias elements 59 are attached to the two axial bias element holders 46. Thereby, the adjustment lens 12b in the adjustment lens frame 61, while pressed to the fixed lens 12a via the ring 66, is placed between both ends 58a, 58b of the radial bias element 58 and the cam faces 65d of the adjusting cams 651, 652, respectively, and positioned relative to the second lens frame 22 on the plane orthogonal to the optical axis OA. The second lens group 12 is thus set.

Now, with the optical property of the second lens group 12 monitored, the adjusting cams 651, 652 are rotated appropriately. The adjustment lens frame 61 and the adjustment lens 12b are properly positioned relative to the second lens frame 22 and the fixed lens 12a, respectively when the second lens group 12 exerts appropriate optical property. This completes the axis alignment of the second lens group 12 or the adjustment lens 12b to the fixed lens 12a in the second lens frame 22.

According to the lens barrel 10, the adjusting cams 651, 652 are configured to securely hold the adjustment lens frame 61 or the adjustment lens 12b in the second lens frame 22. In other words they can adjust the holding position of the adjustment lens frame 61 holding the adjustment lens 12b in the second lens frame 22. Therefore, while the position of the adjustment lens frame 61 relative to the second lens frame 22 is maintained, the second lens frame 22 can be assembled into the moving cylinder 23 or the lens barrel 10.

The second lens frame 22 is accommodated in the back space of the flange 23a of the moving cylinder 23 into which the first rotary cam cylinder 56 is fitted, with the first guide shaft 51 inserted in the concave 41a of the bias element holder 41, the one protrusion 42a abut with the second guide shaft 52, and the other protrusion 42b abut with the third guide shaft 53. The one ends 55a of the second bias elements 55 are engaged with the protrusions 47 with the other ends 55b fixed to the flange 23a of the moving cylinder 23.

Further, the shutter and diaphragm unit 13, first lens frame 21 holding the first lens group 11, and spring bearing 31 are accommodated and fixed in the front space of the flange 23a of the moving cylinder 23 by the blade spring 30 together with the connection frame 27 connected to the first lens frame 21. Then, the moving cylinder 23 is assembled into the lens barrel 10 together with the solid-state image sensor 14, rotary cylinder 24, fixed cylinder 25, base 28, liners 29, stepped frame 32, and circuit board 33.

In the lens barrel 10 the rotary cylinder 24 is rotated relative to the fixed cylinder 25 by drive force transmitted from the driver 34. The moving cylinder 23 is moved straight relative to the base 28 or fixed cylinder 25 in the optical axis direction in accordance with the rotary position of the rotary cylinder 24, following the track of the cam groove 24c of the rotary cylinder 24 engaging with the cam follower 23b. At the same time, following the track of the cam faces 56b or the cam grooves in FIG. 12 engaging with the cam protrusions 43a, the second lens frame 22 is moved straight relative to the moving cylinder 23 in the optical axis direction or on the optical path in accordance with the rotary position of the cylinder consisting of the first and second rotary cam cylinders 56, 57 as the rotary cam unit 26 (FIG. 2B).

Therefore, while the lens barrel 10 is shifted between a contained position in FIG. 2A and a shooting position in FIG. 2B, the first lens group 11 held in the first lens frame 21 and second lens group 12 held in the second lens frame 22 are moved forward and backward on the optical axis OA and the distance from the second lens frame 22 to the first lens group 11 and the shutter and diaphragm unit 13 is properly changed.

Figure 21:
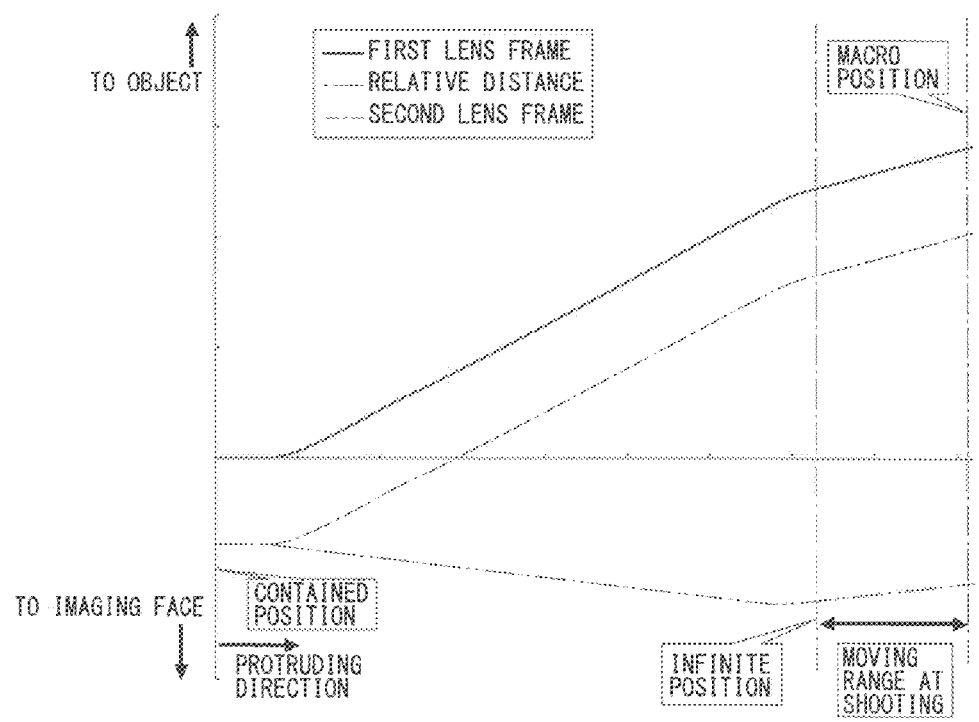
FIG. 21 is a graph indicating the operations of the first lens group 11 and second lens group 12 in a contained state and a shooting state.

FIG. 21 is a graph showing the operation of the first and second lens groups 11, 12 between the contained position and shooting position. The longitudinal axis indicates the positions of the first and second lens groups 11, 12 and a relative distance therebetween in the optical axis direction with the contained position of the first lens group 11 as a reference while the abscissa indicates that the optical system is shifted into the contained state or shooting state. The relative distance between the two lens groups refers to an interval from the first lens group 11 to the second lens group 12. According to the first embodiment, the lens barrel 10 comprises the aligning mechanism 64 and a floating optical system as the combination of the first and second lens frames 21, 22 formed so that the relative distance between the first and second lens groups 11 is variable as in FIG. 21. Accordingly, the moving cylinder 23, rotary cylinder 24, fixed cylinder 25, connection frame 27, base 28, and liners 29 constitute a lens barrel movably holding the first and second lens frames 21, 22.

Figure 22A:
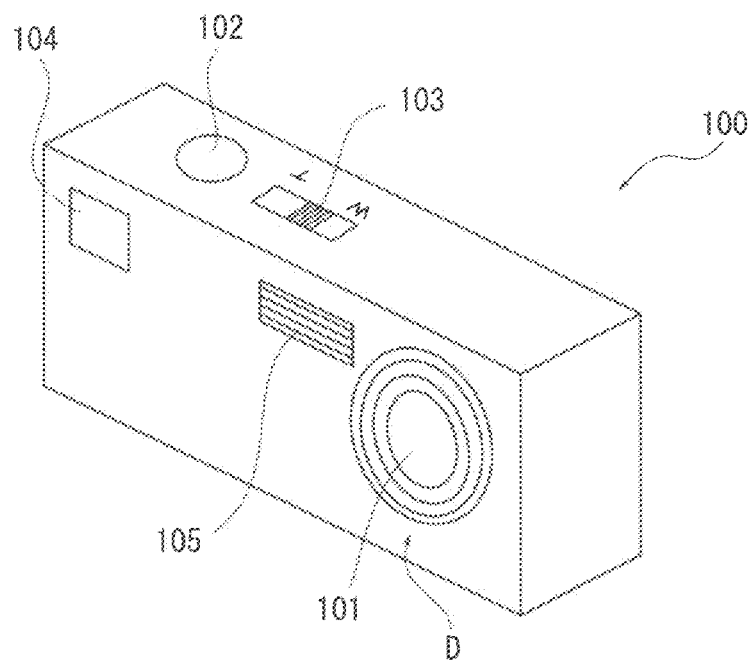
FIG. 22A is a perspective view of a camera 100 including the lens barrel 10 when a photographic lens is collapsed in a camera body and FIG. 22B is the same when a photographic lens is protruded from a camera body.
Figure 22B:
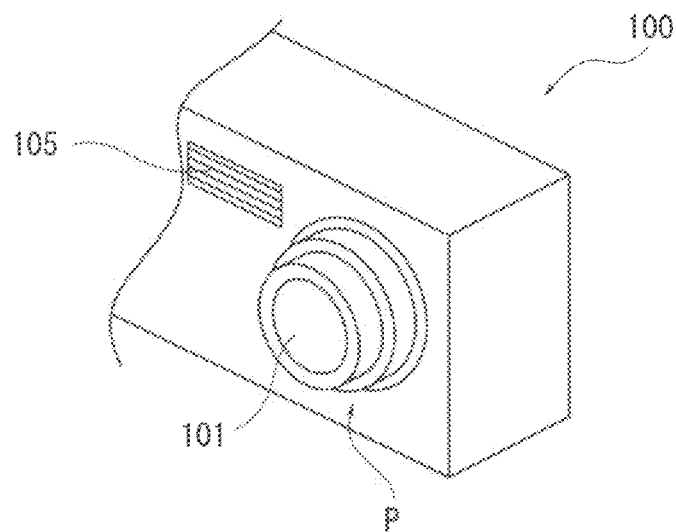
Figure 23:
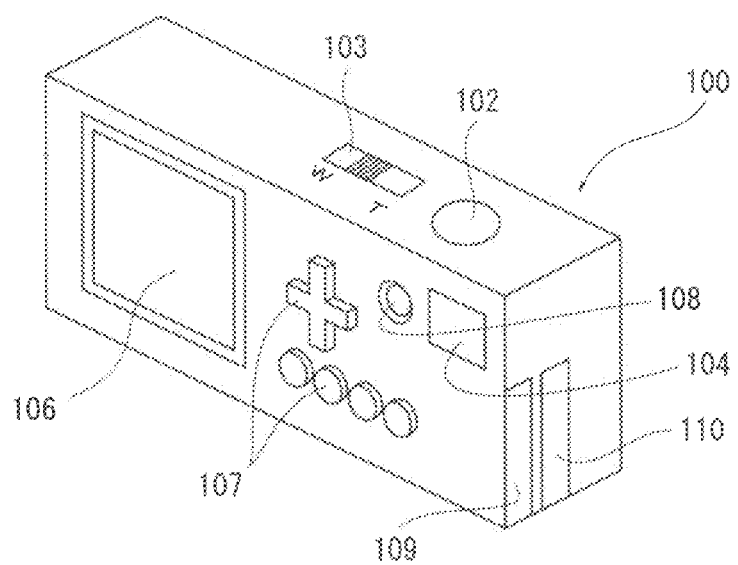
FIG. 23 is a perspective back view of the exterior of the camera 100.
Figure 24:
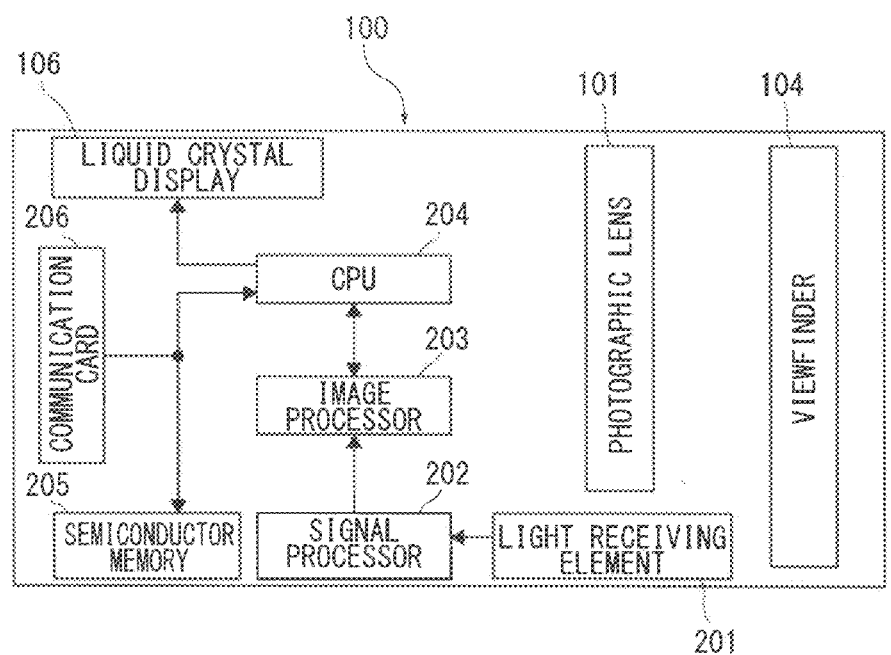
FIG. 24 is a block diagram of the structure of the camera 100.

Next, with reference to FIGS. 22 to 24, an example of an optical device, a camera 100 incorporating an optical unit including the lens barrel 10 according to the first embodiment is described. FIG. 22 is a perspective front view of the camera 100. FIG. 23 is a perspective back view of the camera 100. FIG. 24 is a block diagram of the structure of the camera 100.

In this example the camera 100 is described. However, the optical unit including the lens barrel 10 can be applicable to a personal data assistant (PDA) and a portable data terminal device such as a mobile phone with a camera function which virtually have the same functions and structures as those of the camera 100. It can be also applicable to an image input unit.

In FIGS. 22 and 23, the camera 100 includes a photographic lens 101, a shutter button 102, a zoom lever 103, a viewfinder 104, a strobe light 105, a liquid crystal display 106, an operation button 107, a power switch 108, a memory card throttle 109, and a communication card throttle 110. Further, in FIG. 24 it includes a light receiving element 201, a signal processor 202, an image processor 203, a central processing unit (CPU) 204, a semiconductor memory 205 and a communication card 206. Although not shown, the respective elements are supplied with power from a buttery as a drive power source.

The camera 100 is configured that the image of a subject captured with the photographic lens 101 is read by the light receiving element 201 as an area sensor such as CCD. The photographic lens 101 is an optical unit incorporating the lens barrel 10 according to the first embodiment. For example, the light receiving element 201 includes the solid-state image sensor 14 in FIG. 2A, 2B. The lens barrel 10 functions to hold the lenses so that the lenses are movable at least in unit of lens group. The photographic lens 101 included in the camera 100 is generally such an optical unit.

The output of the light receiving element is converted into digital image data with the signal processor under the control of the CPU 204. The digital image data is then subjected to predetermined image processing with the image processor 203 under the control of the CPU 204 and stored in the semiconductor memory 205 such as nonvolatile memory. The semiconductor memory can be incorporated in a camera body or can be a memory card inserted into the memory card throttle 109. Images captured during shooting and images stored in the semiconductor memory 205 can be displayed on the liquid crystal display. The images stored in the semiconductor memory 205 can be transmitted to an outside via the communication card 206 inserted into the communication throttle 110.

During non-use of the camera 100, the photographic lens 101 is contained in a camera body in a collapsed state as shown in FIG. 22A. Upon a user's manipulation to turn on the power switch 108, the lens barrel is protruded (FIG. 22B) from the camera body to be ready for shooting in FIG. 2B. With use of a focal length variable zoom lens comprised of the first and second lens groups 11, 12, the lens groups are for example arranged at a wide angle position inside the lens barrel 10. By manipulating the zoom lever 103, the arrangement of the lens groups is changed to change magnification to telephoto end. It is preferable that the optical system of the viewfinder 104 can be also changed in magnification with a change in the angle of view of the photographic lens 101.

Upon a half press to the shutter button 102, the camera 100 focuses a subject and upon a full press, it shoots the subject, and then the above processing follows.

By a predetermined manipulation to the operation button 107, the images stored in the semiconductor memory 205 are displayed on the liquid crystal display 106 or transmitted to an outside via the communication card 206. The semiconductor memory 205 and the communication card 206 are loaded into dedicated or general purpose throttles such as the memory card throttle 109 and communication card throttle 110.

In the lens barrel 10 according to the first embodiment, the fixed lens 12a is directly held in the second lens frame 22 and the adjustment lens 12b is held in the adjustment lens frame 61 adjustable by the aligning mechanism 64. This makes it possible to adjust the position of the adjustment lens frame 61 in the second lens frame 22, that is, the position of the adjustment lens 12b relative to the fixed lens 12a with the aligning mechanism 64, enabling the axis alignment of the second lens group 12 with a simple structure.

Further, in the lens barrel 10 according to the first embodiment, the position of the adjustment lens 12b can be adjusted along the plane orthogonal to the optical axis of the second lens group 12 while the adjustment lens 12b in the adjustment lens frame 61 is held in the second lens frame 22. This eliminates the necessity for fixing the second lens group with an adhesive or the like to maintain the lens alignment after completion of alignment work. Thus, the optical axis of the second lens group 12 can be precisely aligned in the second lens frame 22 since the position of the adjustment lens frame 61 is adjustable in the second lens frame 22 in the lens barrel 10.

Further, in the lens barrel 10 according to the first embodiment, the adjusting cams 65 as the aligning mechanism 64 are operable in the second lens frame 22 and have the cam faces 65d inclined to the operation direction to receive the protruded edges 62a of the adjustment lens frame 61. This makes it possible to adjust the position of the adjustment lens frame 61 or the adjustment lens 12b by manipulating the adjusting cams 65 relative to the second lens frame 22. Accordingly, the second lens group 12 can be aligned with a simple structure.

In the lens barrel 10 according to the first embodiment, the optical axes of the fixed lens 12a and the adjustment lens 12b constituting the second lens group 12 can be aligned with each other and securely held in the second lens frame 22. Accordingly, a lens group with a high precision can be realized.

In the lens barrel 10 according to the first embodiment, the adjustment lens 12b held in the adjustment lens frame 61 is a single lens with two aspheric faces so that the second lens group 12 with a high precision can be realized. Compared with the adjustment lens including plural lenses, the lens adjustment in the second lens frame 22 and maintaining the holding force thereto are facilitated and the lenses can be securely held in the aligned position.

In the lens barrel 10 according to the first embodiment, the adjusting cams 65 as the aligning mechanism 64 are rotatably provided in the cam bearings 44 around the central axis line MA and include the cam faces 65d inclined to the central axis line MA to receive the protruded edges 62a of the adjustment lens frame 61. The adjustment lens frame 61 or the adjustment lens 12b can be adjusted in position by rotating the adjusting cams 65 in the cam bearing 44. Therefore, the structure of the lens barrel 10 can be simpler and smaller.

In the lens barrel 10 according to the first embodiment, the two adjusting cams 65 as the aligning mechanism 64 are rotatably provided in the cam bearings 44 around the central axis line MA and include the flat cam faces 65d in a hellicoidal form to receive the protruded edges 62a of the adjustment lens frame 61. It is therefore possible to change the positions at which the cam faces 65 receive the protruded edges 62a along central axis line MA in accordance with the rotary position of the adjusting cams 65. The adjustment lens 12b can be adjusted in position with a simple structure.

In the lens barrel 10 according to the first embodiment, the cam faces 65d are in a hellicoidal form around the rotary direction of the adjusting cams 65. Because of this, with a small, simple structure, it is possible to increase the maximum adjustment amount of the adjustment lens 12b and the adjustment stroke for operating the adjustment lens frame 61 corresponding to the maximum adjustment amount.

In the lens barrel 10 according to the first embodiment, the protruded edges 62a of the adjustment lens frame 61 are received on the flat cam faces 65d in a hellicoidal form. This makes it possible to gradually change the position of the adjustment lens 12b in a minute amount in relation to the rotary amount of the adjusting cams 65. Accordingly, the adjustment lens 12b can be more precisely adjusted.

In the lens barrel 10 according to the first embodiment, the adjusting cams 65 are disposed so that the central axis line MA thereof coincides with the radial direction of the second lens frame 22, the adjustment lens frame 61 is biased to the central axis line MA, and the protruded edges 62a thereof are received on the cam faces 65d. Thereby, it is possible to prevent the adjustment lens 12b from being displaced from the determined position due to the bias force from the radial bias element 58 and securely hold it. This is because to hold the adjustment lens frame 61 or the adjustment lens 12b in the second lens frame 22, the direction of the bias force to the adjustment lens frame 61 is virtually orthogonal to the rotary direction of the adjusting cams 65. Therefore, the force component of the bias force acting to rotate the adjusting cams 65 can be made very small. Supported between both ends 58a, 58b of the radial bias element 58 and the cam faces 65d of the adjusting cams 651, 652 respectively, the adjustment lens frame 61 or the adjustment lens 12b can be adjusted and securely fixed in position.

In the lens barrel 10 according to the first embodiment, the axial bias elements 59 continuously press the adjustment lens frame 61 relative to the second lens frame 22 to the subject side of the optical axis direction of the second lens group 12. The adjustment lens frame 61 holding the adjustment lens 12b is continuously pressed by the ring 66 to the subject and the ring 66 is continuously pressed by the fixed lens 12a to the subject in the through hole 22a of the second lens frame 22. Accordingly, the adjustment lens frame 61 or the adjustment lens 12b can be more properly adjusted in position relative to the fixed lens 12a directly held in the second lens frame 22.

In the lens barrel 10 according to the first embodiment, the rotatable range of the adjusting cams 65 for axis alignment of the adjustment lens 12b in the cam bearings 44 is defined by the convex 65f abutting with the convex 44c. Therefore, the adjustment lens 12b can be adjusted more easily on the basis of the limited rotary position.

In the lens barrel 10 according to the first embodiment, the second lens frame 22 holds, inside the outermost diameter Od, the fixed lens 12a of the second lens group 12, ring 66, adjustment lens frame 61 holding the adjustment lens 12b, aligning mechanism 64 for the adjustment lens frame 61, radial bias element 58, and axial bias elements 59. By setting the outermost diameter Od to be smaller than the inner diameter of the cylinder of the second rotary cam cylinder 57 fitted into the first rotary cam cylinder 56, the second lens frame 22 as an element of optical system can be accommodated in the front space of the flange 23a of the moving cylinder 23. Thus, the optical system can be made up of the second lens group 12 precisely aligned and movable in the moving cylinder 23 to exert high imaging performance.

In the lens barrel 10 according to the first embodiment, the second lens frame 22 holds, inside the outmost diameter Od, the fixed lens 12a of the second lens group 12, ring 66, adjustment lens frame 61 holding the adjustment lens 12b, aligning mechanism 64 for the adjustment lens frame 61, radial bias element 58, and axial bias elements 59. It can be efficiently accommodated as an optical system in the cylindrical front space of the flange 23a of the moving cylinder 23. Accordingly, the optical system in a small structure can exert high imaging performance.

In the lens barrel 10 according to the first embodiment, the adjustment lens frame 61 is precisely adjustable in the second lens frame 22 which is movable in the moving cylinder 23. The first lens group 11 and other elements are disposed in the front space of the flange 23a of the moving cylinder 23. The moving cylinder 23 are assembled into the lens barrel 10 together with the solid-state image sensor 14, rotary cylinder 24, fixed cylinder 25, base 28, liners 29, stepped frame 32 and circuit board 33. In other words, the lens barrel 10 can incorporate the second lens frame 22 as an optical system holding the second lens group 12 precisely aligned by the adjustment lens frame 61 and aligning mechanism 64 so that it can exert high imaging performance.

In the lens barrel 10 according to the first embodiment, the cam faces 65d of the adjusting cams 65 are set on most of the large diameter portion 65a except for the periphery of the central axis line MA. Thus, the cam faces 65d have a degree of freedom for receiving the protruded edges 62a of the end portions 62 of the adjustment lens frame 61 in the radiation direction from the central axis line MA. The degree of freedom for aligning the adjustment lens 12b with the fixed lens 12a can be therefore improved.

In the lens barrel 10 according to the first embodiment, the adjustment lens 12b is placed at an end of the second lens group 12 in the optical axis direction and aligned with the fixed lens 12a. This makes it easier to configure the aligning mechanism 64 for adjustably holding the adjustment lens frame 61 in the second lens frame 22. In the first embodiment, in particular, the adjustment lens placed at an opposite end of the first lens group 11 is aligned with the fixed lens 12a, which enables the entire structure of the aligning mechanism to be simplified.

Accordingly, the lens barrel 10 with a simple structure according to the present embodiment can align the optical axes of the lenses easily and precisely.

Second Embodiment

Next, a lens barrel 10A according to a second embodiment is described. The basic structure of the lens barrel 10A is the same as that of the lens barrel 10 in the first embodiment except for the adjusting cams. The same reference numbers will be used to refer to the same or like parts, and a detailed description is omitted.

Figure 25A:
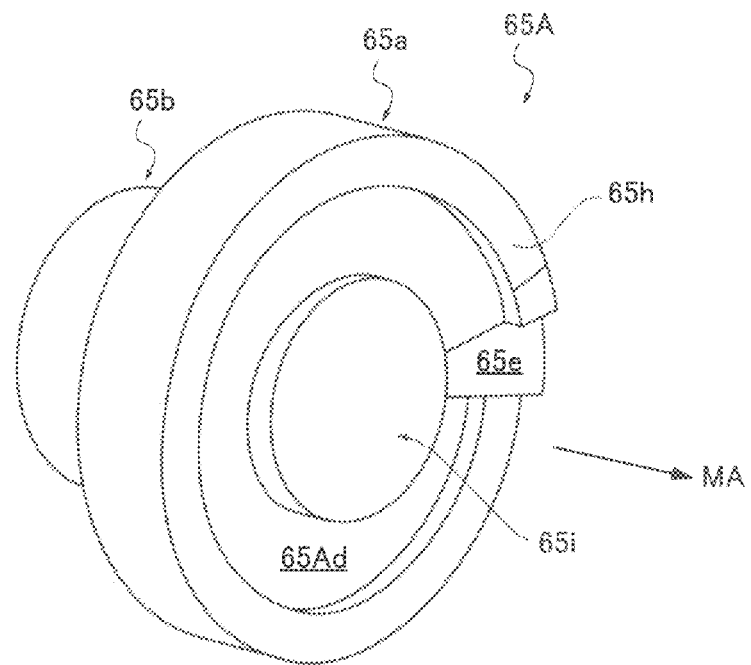
FIG. 25A is a perspective view of an adjusting cam 65A according to a second embodiment, seen from the optical axis OA
Figure 25B:
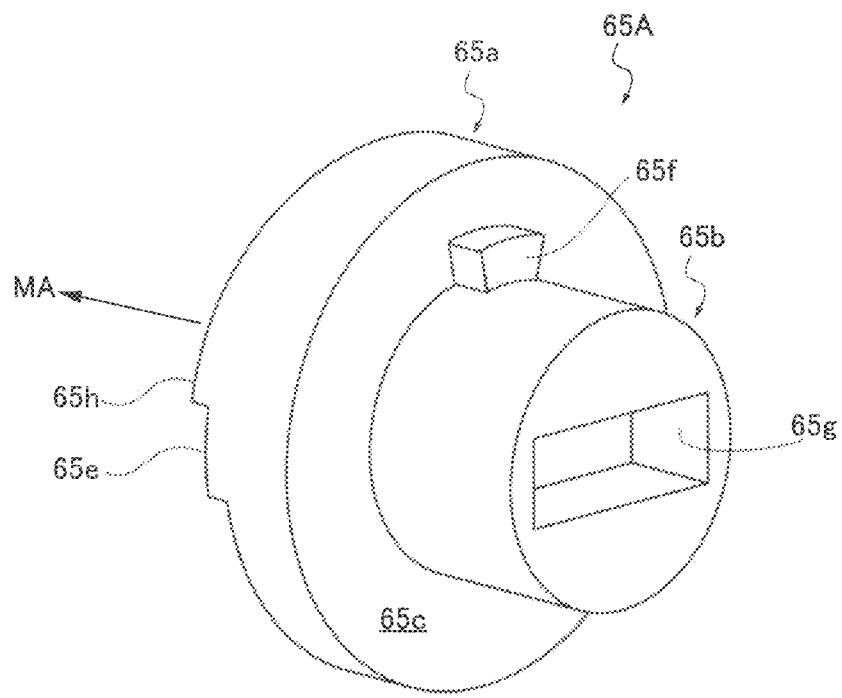
FIG. 25B is the same seen from the backside of FIG. 25A.

The lens barrel 10A according to the second embodiment includes adjusting cams 65A each including a cam face 65A, a flat face 65e, a protrusion 65h, and a convexity 65i on the front face of a large diameter portion 65a, as shown in FIGS. 25A, 25B.

The protrusion 65h protrudes from the circumference of the large diameter portion 65a to the central axis line direction and is in a ring form surrounding a cam face 65Ad. The convexity 65i is in a columnar shape around the central axis line MA and protrudes to the central axis line direction. That is, the cam face 65Ad of the adjusting cam 65A is a circular concavity formed on the front face of the large diameter portion 65a at a position with a predetermined distance from the circumference, and circularly extends between the protrusion 65h and the convexity 65i.

The protrusion 65h and the convexity 65i are to allow the large diameter portion 65a to receive the protruded edge 62a of the end portion 62 of the adjustment lens frame 61 at predetermined positions in the radial direction of the adjusting cam 65A, that is, on the cam face 65Ad having a predetermined width in the radial direction. The predetermined width of the cam face 65Ad is defined by the protrusion 65h and the convexity 65i to a width of the adjusting cam 65Ad in the radial direction when the protruded edge 62a of the adjustment lens frame 61 abuts with the cam faces 65Ad. In reality the width includes a margin to allow the abutting protruded edge 62a to slide.

Figure 26:
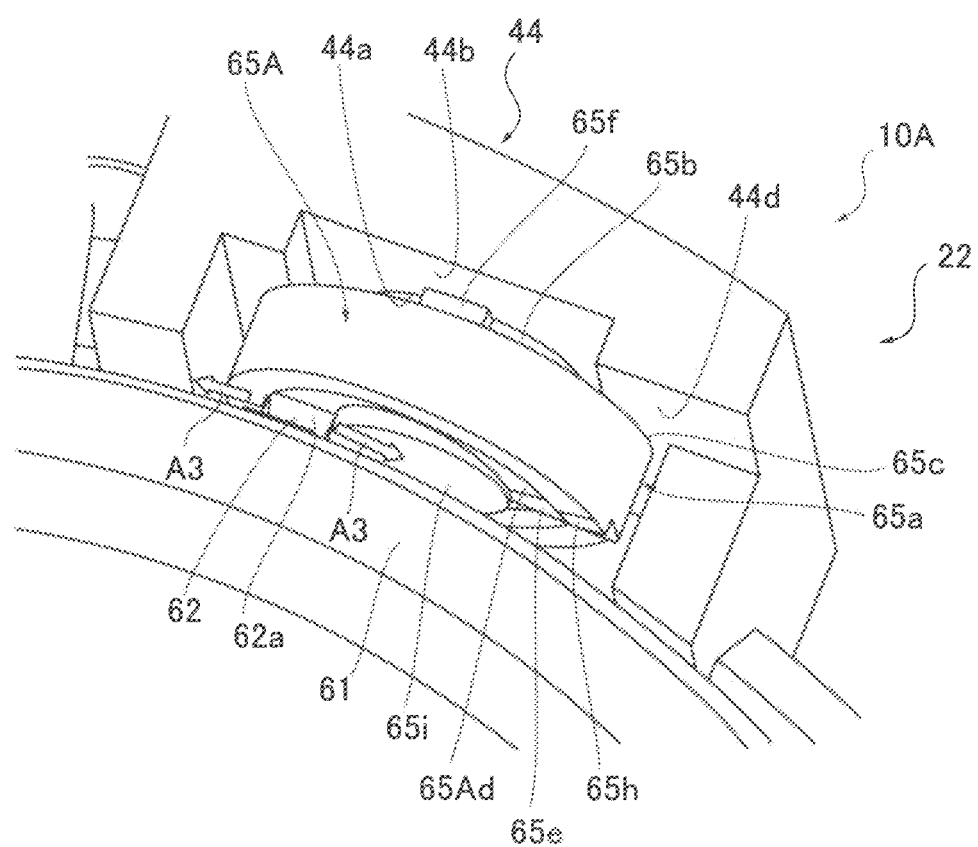
FIG. 26 is a perspective view of the periphery of the adjusting cam 65A in the cam bearing 44, and a protrusion 65h and a convexity 65i.

As shown in FIG. 26, in the lens barrel 10A the protruded edge 62a of the adjustment lens frame 61 is slidably fitted between the protrusion 65h and the convexity 65i on the front face of the large diameter portion 65a and pressed to the cam face 65Ad. Abutting with the cam face 65Ad, the protruded edge 62a of the adjustment lens frame is prevented from being displaced in the radial direction of the adjustment lens frame 61, that is, circumference direction of the optical axis OA indicated by the arrow A3 in FIG. 26. Thus, the protrusion 65h and convexity 65i function as a displacement restricting element for the protruded edges 62a of the adjustment lens frame 61.

The lens barrel 10A according to the second embodiment can achieve the same effects as those of the lens barrel 10 according to the first embodiment 10.

In addition, as described above, the abutting protruded edges 62a of the adjustment lens frame 61 can be prevented from being displaced on the large diameter portions 65a in the radial direction of the adjustment lens frame 61. Accordingly, the protruded edges 62a of the adjustment lens frame can always abut with the cam faces 65Ad of the adjusting cams 65A at a predetermined position, which can improve the positioning stability of the adjustment lens frame 61 in the second lens frame 22.

Figure 27:
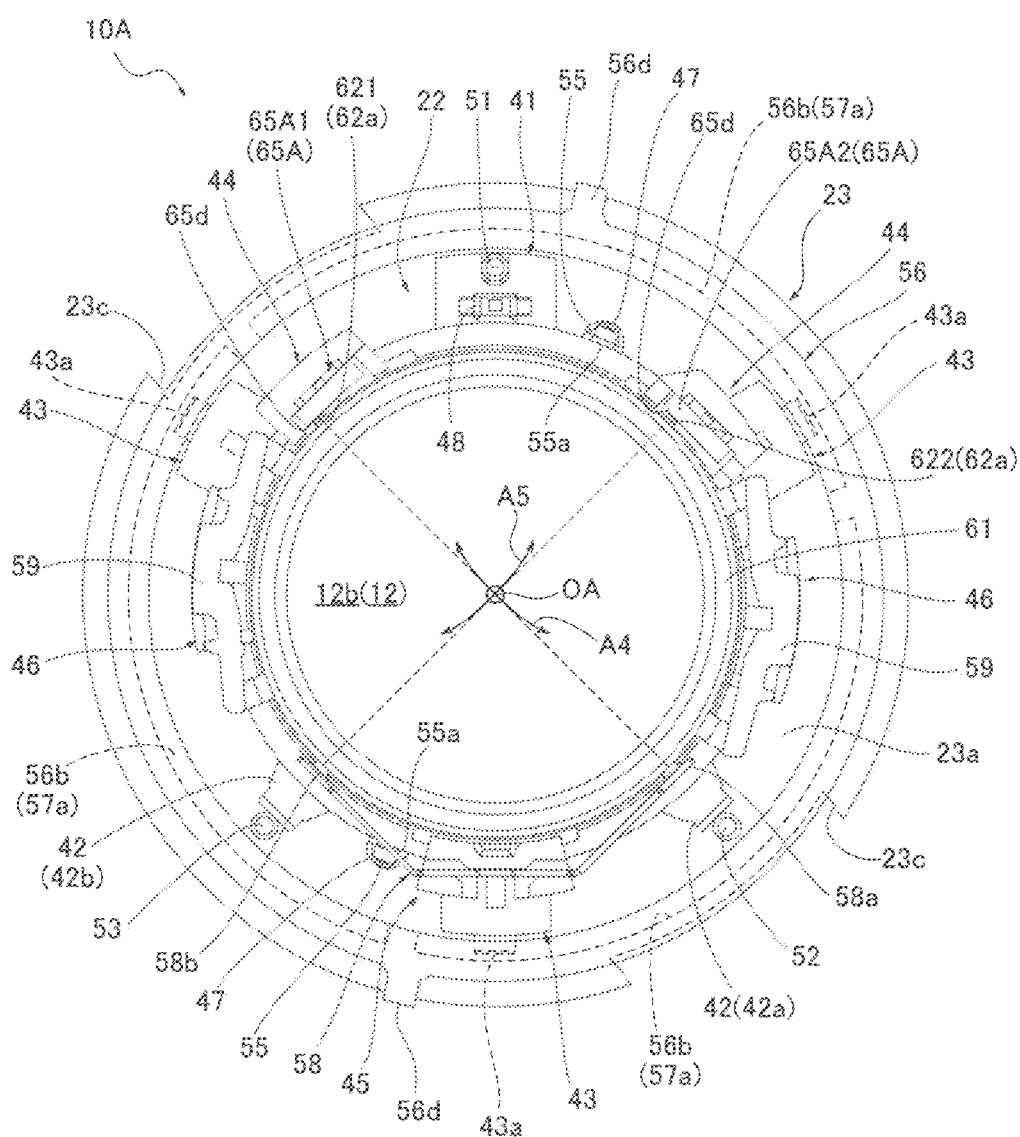
FIG. 27 shows a lens barrel 10A according to the second embodiment in which an adjustment lens frame 61 is adjusted inside the second lens frame 22.

Further, as shown in FIG. 27, supported between the both ends 58a, 58b of the radial bias element 58 and the cam faces 65Ad of the adjusting cams 65A1, 65A2, the adjustment lens frame 61 is positioned in first and second rotary directions A4, A5 around the cam faces 65Ad of the adjusting cams 65A2, 65A1 on the plane orthogonal to the optical axis OA in the second lens group 12, respectively. Thus, the adjustment lens 12b can be aligned with the fixed lens 12a with a higher precision by adjusting the rotary position of the adjustment lens frame 61 on the plane orthogonal to the optical axis of the adjustment lens 12b.

Thus, the lens barrel 10A with a simple structure according to the second embodiment can easily align the optical axes of the lenses with high precision.

The above embodiments have described the lens barrels 10, 10A by way of example. The present invention should not be limited to such an example. The present invention is applicable to an arbitrary lens barrel as long as it includes a lens group of at least two more lenses, an adjustment lens having one or more lenses and a fixed lens having one or more lenses, a lens frame holding the lens group and including an adjustment lens frame holding the adjustment lens, and an aligning mechanism for movably holding the adjustment lens frame relative to the lens frame to a direction orthogonal to the optical axis of the lens group.

According to the above embodiments, the second lens group 12 is aligned in the second lens frame 22 before assembly. Alternatively, the axis alignment can be done after assembly. For example, the second lens frame 22a is tentatively assembled and accommodated in the back space of the flange 23a of the moving cylinder 23 fitted into the first rotary cam cylinder 56. Then, the shutter and diaphragm unit 13, first lens frame 21 holding the first lens group 11, and the spring bearing 31 are accommodated in the front space (subject side) of the flange 23a, and the moving cylinder 23 is fixed together with the connection frame 27 connected to the first lens frame 21 by the blade spring 30. The second lens group 12 is then aligned. In this case, the adjusting cams 65 (65A1, 65A2) are properly rotated while the image of a subject captured with the optical system including the first and second lens groups 12 and the shutter and diaphragm unit 13 is monitored. When the subject image is properly captured, the adjustment lens frame 61 is properly aligned with the second lens frame 22, in other words, the adjustment lens 12b is properly aligned with the first lens group 11, shutter and diaphragm unit 13, and fixed lens 12a. This completes the axis alignment of the adjustment lens 12b.

Moreover, the above embodiments have described an example where the fixed lens 12a is made up of the four lenses on the subject side and the single lens on the image plane side is the adjustment lens 12b. However, the present invention should not be limited to such an example. Alternatively, one or more lenses constituting the second lens group 12 or four lenses on the subject side can be the position adjustable lens held in the adjustment lens frame in the second lens frame 22.

The above embodiments have described an example where the adjustment lens 12b is placed at an outer position on the image plane side in the optical axis direction of the second lens group 12. The present invention should not be limited to such an example. Alternatively, it can be placed at an outer position on the subject side or in the middle position.

The above embodiments have described an example where the second lens group 12 can be aligned. The present invention should not be limited to such an example. The other group, for example, the first lens group 11 can be aligned.

The above embodiments have described an example where the optical system is comprised of the adjustment lens frame 61, second lens group 12 precisely aligned with the aligning mechanism 64, and first lens group 11. The present invention should not be limited to such an example. Alternatively, it can be comprised of other lens groups as long as it includes a lens group having a fixed lens held in a lens frame which holds an adjustment lens frame in which an adjustment lens is held adjustably along the optical axis with an aligning mechanism.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A lens barrel comprising:
   a lens group comprising a fixed lens including one or more lenses and an adjustment lens including one or more lenses;
   a lens frame to hold the lens group, including an adjustment lens frame to hold the adjustment lens and an aligning mechanism to hold the adjustment lens frame movably in a direction orthogonal to an optical axis of the lens group relative to the lens frame;
   two radial bias elements;
   two adjusting cams, a first of the adjusting cams being associated with a first of the radial bias elements, and a second of the adjusting cams being associated with a second of the radial bias elements, such that each radial bias element is configured to apply a bias force to the adjustment lens frame to bias the respectively associated adjusting cam,
   wherein the radial bias elements and the respectively associated adjusting cams, are disposed to oppose each other across the optical axis in a radial direction of the adjustment lens frame, such that the adjustment lens frame is biased in first and second radial directions,
   wherein the adjustment lens frame is biased along a plane orthogonal to the optical axis, and
   wherein a position of the adjustment lens frame is configured to be adjusted in the first and second radial directions.

2. A lens barrel according to claim 1, wherein the two adjusting cams each have a cam face that is flat, and
   wherein each of the cam faces are inclined relative to a line connecting a contact point between the adjusting cam and the adjustment lens frame and the optical axis.

3. A lens barrel according to claim 2, wherein:
   the adjusting cams are configured to be rotatable relative to the lens frame around the bias directions of the radial bias elements, respectively; and
   the cam faces are formed in a hellicoidal shape and inclined relative to the bias directions of the radial bias elements, respectively.

4. A lens barrel according to claim 3, wherein
   the adjusting cams each comprises a displacement restricting element configured to restrict displacement of an end portion of the lens frame in a circumferential direction around the optical axis of the lens group while the end portion abuts with the cam face.

5. A lens barrel according to claim 3, wherein
   the adjusting cams and the lens frame each include a rotation restricting element to restrict a rotary range of the adjusting cam.

6. A lens barrel according to claim 1, wherein
   the adjustment lens is placed at an outer position in the lens group in the optical axis direction.

7. A lens barrel according to claim 6, wherein
   the lens frame includes an axial bias element to bias the adjustment lens frame to the fixed lens in the optical axis direction of the lens group.

8. A lens barrel according to claim 1, wherein
   the lens frame includes the aligning mechanism and the adjustment lens frame inside an outermost diameter position around the optical axis of the lens group.

9. A lens barrel comprising:
   a first lens group comprising a fixed lens including one or more lenses and an adjustment lens including one or more lenses;

a second lens group comprising one or more lenses;
a first lens frame to hold the first lens group, including an adjustment lens frame to hold the adjustment lens and an aligning mechanism to hold the adjustment lens frame movably in a direction orthogonal to an optical axis of the lens group relative to the lens frame;
a second lens frame to hold the second lens group, wherein the lens barrel movably holds the first and second lens frames inside; and
two radial bias elements;
two adjusting cams, a first of the adjusting cams being associated with a first of the radial bias elements, and a second of the adjusting cams being associated with a second of the radial bias elements, such that each radial bias element is configured to apply a bias force to the adjustment lens frame to bias the respectively associated adjusting cam,
wherein the radial bias elements and the respectively associated adjusting cams, are disposed to oppose each other across the optical axis in a radial direction of the adjustment lens frame, such that the adjustment lens frame is biased in first and second radial directions,
wherein the adjustment lens frame is biased along a plane orthogonal to the optical axis, and
wherein a position of the adjustment lens frame is configured to be adjusted in the first and second radial directions.

10. An imaging device comprising the lens barrel according to claim 1.

11. A digital camera comprising the lens barrel according to claim 1.

12. A portable data terminal device comprising the lens barrel according to claim 1.

13. An image input device comprising the lens barrel according to claim 1.

* * * * *